United States Patent
Schwankl et al.

(10) Patent No.: US 7,890,375 B2
(45) Date of Patent: Feb. 15, 2011

(54) METHOD AND SYSTEM TO FACILITATE PRE-ORDERING VIA AN ELECTRONIC COMMERCE FACILITY, AND TO AUTOMATICALLY FACILITATE SATISFYING OF A PRE-ORDER UPON LISTING OF AN APPROPRIATE OFFER VIA THE ELECTRONIC COMMERCE FACILITY

(75) Inventors: Michael Schwankl, Collegeville, PA (US); Srinivas Balijepalli, Devon, PA (US); Vadim Geshel, Philadelphia, PA (US); Pete Borowsky, Yardley, PA (US); Joshua Kopelman, Wynnewood, PA (US)

(73) Assignee: Half.com, Inc., San Jose, CA (US)

( * ) Notice: Subject to any disclaimer, the term of this patent is extended or adjusted under 35 U.S.C. 154(b) by 2527 days.

(21) Appl. No.: 09/920,573

(22) Filed: Jul. 31, 2001

(65) Prior Publication Data

US 2002/0099642 A1 Jul. 25, 2002

(51) Int. Cl.
G06Q 30/00 (2006.01)
G06F 17/30 (2006.01)
G06Q 40/00 (2006.01)

(52) U.S. Cl. .............................. 705/26; 705/27; 705/37

(58) Field of Classification Search ............. 705/26–27, 705/37
See application file for complete search history.

(56) References Cited

U.S. PATENT DOCUMENTS 3,573,747 A 4/1971 Adams et al.

(Continued)

FOREIGN PATENT DOCUMENTS

CA 2253543 10/1997

(Continued)

OTHER PUBLICATIONS

Fickes, Michael. "Waste Web". Waste Age. Overland Park: Aug. 2000. vol. 31, Iss. 8, p. SS6, (13 pages).*

(Continued)

*Primary Examiner*—Elda Milef
(74) *Attorney, Agent, or Firm*—Schwegman, Lundberg & Woessner, P.A.

(57) ABSTRACT

A method to facilitate pre-ordering of an offering via a network-based transaction facility includes, responsive to user identification of an offering, communicating offering information to the user regarding the offering. In conjunction with the offering information, a selectable option is communicated to the user to pre-order the offering by specifying pre-order attribute information. Following selection the pre-order option by a user and provision of the pre-order attribute information, a pre-order relating to an item is recorded at the transaction facility. The pre-order specifies a plurality of pre-order attributes. An offer to sell the item is received at the transaction facility, the offer specifying a plurality of offer attributes. A matching operation is automatically performed to detect a correspondence between the pre-order and the offer. The matching operation utilizes at least one pre-order attribute of the pre-order attributes and at least one offer attribute of the offer attributes to detect the correspondence. Responsive to a detection of the correspondence by the matching operation, a transaction facilitating operation is automatically performed to facilitate establishment of a transaction whereby the pre-order is satisfied by the offer to sell the item.

47 Claims, 20 Drawing Sheets

U.S. PATENT DOCUMENTS

| | | | |
|---|---|---|---|
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,823,265 A | 4/1989 | Nelson | |
| 4,864,516 A | 9/1989 | Gaither et al. | |
| 4,903,201 A | 2/1990 | Wagner | |
| 5,032,989 A | 7/1991 | Tornetta | |
| 5,063,507 A | 11/1991 | Lindsey et al. | |
| 5,077,665 A | 12/1991 | Silverman et al. | |
| 5,101,353 A | 3/1992 | Lupien et al. | |
| 5,136,501 A | 8/1992 | Silverman et al. | |
| 5,168,446 A | 12/1992 | Wiseman | |
| 5,205,200 A | 4/1993 | Wright | |
| 5,243,515 A | 9/1993 | Lee | |
| 5,258,908 A | 11/1993 | Hartheimer et al. | |
| 5,280,422 A | 1/1994 | Moe et al. | |
| 5,283,731 A | 2/1994 | Lalonde et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,325,297 A | 6/1994 | Bird et al. | |
| 5,329,589 A | 7/1994 | Fraser et al. | |
| 5,375,055 A | 12/1994 | Togher et al. | |
| 5,394,324 A | 2/1995 | Clearwater | |
| 5,426,281 A | 6/1995 | Abecassis | |
| 5,485,510 A | 1/1996 | Colbert | |
| 5,553,145 A | 9/1996 | Micali | |
| 5,557,728 A | 9/1996 | Garrett et al. | |
| 5,584,025 A | 12/1996 | Keithley et al. | |
| 5,596,994 A | 1/1997 | Bro | |
| 5,598,557 A | 1/1997 | Doner et al. | |
| 5,640,569 A | 6/1997 | Miller et al. | |
| 5,657,389 A | 8/1997 | Houvener | |
| 5,664,115 A | 9/1997 | Fraser | |
| 5,689,652 A | 11/1997 | Lupien et al. | |
| 5,694,546 A | 12/1997 | Reisman | |
| 5,706,457 A | 1/1998 | Dwyer et al. | |
| 5,710,889 A | 1/1998 | Clark et al. | |
| 5,715,314 A | 2/1998 | Payne et al. | |
| 5,715,402 A | 2/1998 | Popolo | |
| 5,717,989 A * | 2/1998 | Tozzoli et al. | 705/37 |
| 5,722,418 A | 3/1998 | Bro | |
| 5,727,165 A | 3/1998 | Ordish et al. | |
| 5,736,977 A | 4/1998 | Hughes | |
| 5,754,850 A | 5/1998 | Janssen | |
| 5,771,291 A | 6/1998 | Newton et al. | |
| 5,771,380 A | 6/1998 | Tanaka et al. | |
| 5,790,790 A | 8/1998 | Smith et al. | |
| 5,794,207 A | 8/1998 | Walker et al. | |
| 5,794,210 A | 8/1998 | Goldhaber et al. | |
| 5,794,219 A | 8/1998 | Brown | |
| 5,799,285 A | 8/1998 | Klingman | |
| 5,803,500 A | 9/1998 | Mossberg | |
| 5,812,670 A | 9/1998 | Micali | |
| 5,818,836 A | 10/1998 | DuVal | |
| 5,818,914 A | 10/1998 | Fujisaki | |
| 5,826,244 A | 10/1998 | Huberman | |
| 5,835,896 A | 11/1998 | Fisher et al. | |
| 5,845,265 A | 12/1998 | Woolston | |
| 5,845,266 A | 12/1998 | Lupien et al. | |
| 5,850,442 A | 12/1998 | Muftic | |
| 5,872,848 A | 2/1999 | Romney et al. | |
| 5,873,069 A | 2/1999 | Reuhl et al. | |
| 5,874,412 A | 2/1999 | Priebe et al. | |
| 5,884,056 A | 3/1999 | Steele | |
| 5,884,272 A | 3/1999 | Walker et al. | |
| 5,890,138 A * | 3/1999 | Godin et al. | 705/26 |
| 5,905,974 A | 5/1999 | Fraser et al. | |
| 5,905,975 A | 5/1999 | Ausubel | |
| 5,922,074 A | 7/1999 | Richard et al. | |
| 5,924,072 A | 7/1999 | Havens | |
| 5,926,794 A | 7/1999 | Fethe | |
| 5,991,739 A | 11/1999 | Cupps et al. | |
| 6,035,402 A | 3/2000 | Vaeth et al. | |
| 6,044,363 A | 3/2000 | Mori et al. | |
| 6,047,264 A | 4/2000 | Fisher et al. | |
| 6,055,518 A | 4/2000 | Franklin et al. | |
| 6,058,417 A | 5/2000 | Hess et al. | |
| 6,061,448 A | 5/2000 | Smith et al. | |
| 6,061,660 A | 5/2000 | Eggleston et al. | |
| 6,073,117 A | 6/2000 | Oyanagi et al. | |
| 6,085,176 A | 7/2000 | Woolston | |
| 6,104,815 A | 8/2000 | Alcorn et al. | |
| 6,119,137 A | 9/2000 | Smith et al. | |
| 6,131,087 A | 10/2000 | Luke et al. | |
| 6,178,408 B1 | 1/2001 | Copple et al. | |
| 6,192,407 B1 | 2/2001 | Smith et al. | |
| 6,199,050 B1 * | 3/2001 | Alaia et al. | 705/37 |
| 6,202,051 B1 | 3/2001 | Woolston | |
| 6,230,188 B1 | 5/2001 | Marcus | |
| 6,243,691 B1 | 6/2001 | Fisher et al. | |
| 6,253,188 B1 | 6/2001 | Witek et al. | |
| 6,272,467 B1 | 8/2001 | Durand et al. | |
| 6,574,608 B1 | 6/2003 | Dahod et al. | |
| 6,594,633 B1 | 7/2003 | Broerman | |
| 6,665,389 B1 | 12/2003 | Haste, III | |
| 6,684,196 B1 | 1/2004 | Mini et al. | |
| 6,704,716 B1 * | 3/2004 | Force | 705/80 |
| 6,732,080 B1 | 5/2004 | Blants | |
| 6,952,682 B1 * | 10/2005 | Wellman | 705/37 |
| 7,191,147 B2 | 3/2007 | Heene et al. | |
| 7,191,176 B2 | 3/2007 | McCall et al. | |
| 7,246,067 B2 | 7/2007 | Austin et al. | |
| 7,302,404 B2 | 11/2007 | Solomon | |
| 7,359,498 B2 | 4/2008 | Faber et al. | |
| 7,386,508 B1 | 6/2008 | Walker et al. | |
| 7,698,169 B2 | 4/2010 | Raccah et al. | |
| 2002/0007340 A1 * | 1/2002 | Isaf et al. | 705/37 |
| 2002/0027567 A1 | 3/2002 | Niamir | |
| 2002/0029187 A1 | 3/2002 | Meehan et al. | |
| 2002/0029193 A1 | 3/2002 | Ranjan et al. | |
| 2002/0038248 A1 | 3/2002 | Mager et al. | |
| 2002/0040319 A1 | 4/2002 | Brauer | |
| 2002/0042835 A1 * | 4/2002 | Pepin et al. | 709/232 |
| 2002/0059228 A1 | 5/2002 | McCall et al. | |
| 2002/0147674 A1 * | 10/2002 | Gillman | 705/37 |
| 2002/0156672 A1 | 10/2002 | Burko | |
| 2003/0004856 A1 | 1/2003 | Brown et al. | |
| 2003/0061087 A1 | 3/2003 | Srimuang | |
| 2003/0204474 A1 | 10/2003 | Capek et al. | |
| 2004/0015416 A1 | 1/2004 | Foster et al. | |
| 2004/0093253 A1 | 5/2004 | Iijima | |
| 2004/0260621 A1 | 12/2004 | Foster et al. | |
| 2005/0216364 A1 | 9/2005 | Jurisic et al. | |
| 2005/0283420 A1 | 12/2005 | Bailey et al. | |
| 2006/0224490 A1 | 10/2006 | Seth et al. | |
| 2006/0277145 A1 | 12/2006 | Raccah et al. | |
| 2007/0003038 A1 | 1/2007 | Siegel et al. | |

FOREIGN PATENT DOCUMENTS

| | | |
|---|---|---|
| FR | 2658635 A1 | 8/1991 |
| NL | 9300266 | 2/1993 |
| WO | WO-9215174 A1 | 9/1992 |
| WO | WO-9517711 A1 | 6/1995 |
| WO | WO-9634356 A1 | 10/1996 |
| WO | WO-9737315 A1 | 10/1997 |

WO    WO-9963461 A1    12/1999

OTHER PUBLICATIONS

U.S. Appl. No. 09/802,719, Non-Final Office Action mailed Dec. 21, 2007, 19 pgs.
U.S. Appl. No. 09/802,719, Final Office Action mailed Aug. 8, 2008, 10 pgs.
U.S. Appl. No. 09/802,719, filed Mar. 31, 2008 to Non-Final Office Action mailed Dec. 31, 2007, 17 pgs.
U.S. Appl. No. 09/802,719, filed Oct. 28, 2007 to Final Office action mailed May 29, 2007, 17 pgs.
"U.S. Appl. No. 09/802,719, Examiner Interview Summary mailed Oct. 28, 2007", 1 pg.
"U.S. Appl. No. 09/802,719, Examiner Interview Summary mailed Dec. 8, 2008", 2 pgs.
"U.S. Appl. No. 09/802,719, Final Office Action mailed May 29, 2007", 12 pgs.
"U.S. Appl. No. 09/802,719, Final Office Action mailed Jul. 22, 2009", 12 pgs.
"U.S. Appl. No. 09/802,719, Non Final Office Action mailed Mar. 23, 2006", 10 pgs.
"U.S. Appl. No. 09/802,719, Non Final Office Action mailed Dec. 1, 2006", 11 pgs.
"U.S. Appl. No. 09/802,719, Non-Final Office Action mailed Feb. 10, 2009", 15 pgs.
"U.S. Appl. No. 09/802,719, Notice of Allowance mailed Mar. 24, 10", 6 pgs.
"U.S. Appl. No. 09/802,719, Response filed Jan. 11, 2010 to Restriction Requirement mailed Dec. 10, 2009", 9 pgs.
"U.S. Appl. No. 09/802,719, Response filed Mar. 1, 2007 to Non Final Office Action mailed Dec. 1, 2006", 18 pgs.
"U.S. Appl. No. 09/802,719, Response filed May 11, 2009 to Non Final Office Action mailed Feb. 10, 2009", 15 pgs.
"U.S. Appl. No. 09/802,719, Response filed Aug. 21, 2006 to Non Final Office Action mailed Mar. 23, 2006", 18 pgs.
"U.S. Appl. No. 09/802,719, Response filed Sep. 22, 2009 to Final Office Action mailed Jul. 22, 2009", 9 pgs.
"U.S. Appl. No. 09/802,719, Restriction Requirement mailed Dec. 10, 2009", 6 pgs.
"U.S. Appl. No. 10/536,076, Advisory Action mailed Oct. 9, 2009", 3 pgs.
"U.S. Appl. No. 10/536,076, Final Office Action mailed Jul. 30, 2009", 15 pgs.
"U.S. Appl. No. 10/536,076, Final Office Action mailed Oct. 16, 2008", 13 pgs.
"U.S. Appl. No. 10/536,076, Non-Final Office Action mailed Jan. 21, 2009", 16 pgs.
"U.S. Appl. No. 10/536,076, Non-Final Office Action mailed May 15, 2008", 17 pgs.
"U.S. Appl. No. 10/536,076, Notice of Allowance mailed Nov. 25, 2009", 20 pgs.
"U.S. Appl. No. 10/536,076, Response filed Mar. 24, 2008 to Restriction Requirement mailed Feb. 22, 2008", 8 pgs.
"U.S. Appl. No. 10/536,076, Response filed Apr. 21, 2009 to Non Final Office Action mailed Jan. 21, 2009", 11 pgs.
"U.S. Appl. No. 10/536,076, Response filed Jul. 10, 2008 to Non-Final Office Action mailed May 15, 2008", 16 pgs.
"U.S. Appl. No. 10/536,076, Response filed Sep. 30, 2009 to Final Office Action mailed Jul. 30, 2009", 10 pgs.
"U.S. Appl. No. 10/536,076, Response filed Dec. 16, 2008 to Final Office Action mailed Oct. 16, 2008", 12 pgs.
"U.S. Appl. No. 10/536,076, Response filed Dec. 16, 2008 to Final Office Action mailed Oct. 16, 2008", 12 pgs.
"U.S. Appl. No. 10/536,076, Restriction Requirement mailed Feb. 22, 2008", 7 pgs.
"U.S. Appl. No. 11/095,934, on-Final Office Action mailed Jul. 30, 2008", 16 pgs.
"U.S. Appl. No. 11/158,916, Non-Final Office Action mailed Jan. 22, 2010", 8 pgs.
"U.S. Appl. No. 11/158,916, Non-Final Office Action mailed Dec. 29, 2008", 5 pgs.
"U.S. Appl. No. 11/158,916, Response filed Mar. 30, 2009 to Non Final Office Action mailed Dec. 29, 2008", 11 pgs.
"U.S. Appl. No. 11/158,916, Response filed May 24, 2010 to Non Final Office Action mailed Jan. 22, 2010", 11 pgs.
"EHarmony Expert Guidance", Home page plus communication guidelines information, [Online]. Retrieved from the Internet: <URL: http://www.eharmony.com>, (Copyright 2000-2005), 4 p.
"Have a Seat: Nexan Network and Respond.com Partner to Create Reverse Auction Site Homeseat.com", Buisness Wire,New York, (Feb. 4, 2002), p. 1.
"Match.com Overview and Communication", Home page and communication explanation., [Online], (Copyright 2005), 8 p.
"Onsale Joins Fray as Online Shopping Picks Up Speed: Internet Booms", Computer Reseller News, CMP Publications, Inc., USA. (Jun. 5, 1995), 1 pg.
"Onsale: Onsale Brings Thrill of Auctions and Bargain Hunting Online; Unique Internet retail service debuts with week-long charity auction for The Computer.Museum in Boston", Business Wire, Dialog Web. 0489267 BW0022, (May 24, 1995), 3 pages.
"Respond.com Helps Small Businesses Compete on the Web; Business Wins Customers Without Costly Ad Campaign", (Nov. 12, 1999), 2 pgs.
"Ziprealty", Homepage, real estate listing and contact information for real estate agent, [Online]. Retrieved from the Internet: <URL: http://www.ziprealty.com>, (Copyright 1999-2005), 8 p.
Baumann, G. W, "Personal Optimized Decision/Transaction Program", IBM Technical Disclosure Bulletin (Jan. 1995), 83-84.
Clemons, E., "Evaluating the prospects for alternative electronic securities", Proceedings of ICIS 91: 12th International Conference on Information Systems, (Dec.16-18, 1991), 53-61.
Graham, I, "The Emergence of Linked Fish Markets in Europe", Focus Theme, 1-3.
Hauser, R, "Anonymous Delivery of Goods in Electronic Commerce", IBM Technical Disclosure Bulletin, 39(3), (Mar. 1996), 363-366.
Hess, C M, et al., "Computerized Loan Organization System: An Industry Case Study of the Electronic Markets Hypothesis", MIS Quarterly, vol. 18(3), (Sep. 1994), 251-274.
Klein, S, "Introduction to Electronic Auctions", Focus Theme, 1-4.
Lee, H G, "AUCNET: Electronic Intermediary for Used-Car Transactions", Focus Theme, 1-5.
Lee, H. G, "Electronic brokerage and electronic auction: the impact of IT on market structures", Proceedings of the Twenty-Ninth Hawaii International Conference on System Sciences, vol. 4, (1996), 397-406.
Malone, T., et al., "Electronic Markets and Electronic Hierarchies", Communications of the ACM, 14(25), (Jun. 1987), 484-497.
Mardesich, Jodi, "Site Offers Clearance for End-of-Life Products - Onsale Takes Auction Gavel Electronic", Computer Reseller News, (Jul. 8, 1996), 2 pps.
Massimb, Marcel, "Electronic Trading, Market Structure and Liquidity", Financial Analysts Journal, 50(1), (Jan./Feb. 1994), 39-50.
Meade, J., "Visual 360: A Performance Appraisal System That's 'Fun'", HR Magazine, Society for Human Resource Management., (Jul. 1999), 3 pgs.
Neo, B S, "The implementation of an electronic market for pig trading in Singapore", Journal of Strategic Information Systems; vol. 1(5), (Dec. 1992), 278-288.
Post, D L, et al., "Application of auctions as a pricing mechanism for the interchange of electric power", IEEE Transactions on Power Systems, 10(3), (Aug. 1995), 1580-1584.
Preist, Chris, et al., "Adaptive Agents in a Persistent Shout Double Auction", International Conference on Information and Computation Economies, Proceedings of the first international conference on Information and computation economies, (1999), 11-18.
Reck, M., "Formally Specifying an Automated Trade Execution System", The Journal of Systems and Software, 1993, Elsevier Science Publishing, USA,11993), 245-252.
Reck, Martin, "Trading-Process Characteristics of Electronic Auctions", Focus Theme, 1-7.
Resnick, Paul, "Reputation systems", Communications of the ACM, 43(12), (Dec. 2000), 45-48.

Rockoff, T E, et al., "Design of an Internet-based system for remote Dutch auctions", Internet Research: Electronic Networking Applications and Policy, vol. 5(4), (Jan. 1, 1995), 10-16.

Schmid, B F, "The Development of Electronic Commerce", EM - Electronic Markets, No. 9-10, (Oct. 1993), 2 pgs.

Siegmann, Ken, "Nowhere to go but up", PC Week; vol. 12(42), Ziff-Davis Publishing Company, (Oct. 23, 1995), 1-3.

Tjostheim, Ingvar, "A case study of an on-line auction for the World Wide Web", Norwegjan Computing Center (NR) 1-10.

Turban, E, "Auctions and Bidding on the Internet: An Assessment", Focus Theme, 1-5.

Van Heck, E., et al., "Experiences with Electronic Auctions in the Dutch Flower Industry", ,Focus Theme; Erasmus University, The Netherlands, 6 pgs.

Warbelow, A, et al., "Aucnet: TV Auction Network System", Harvard Business School Case/Study, HBVR#9-190-001, USA, (Jul. 1989), 1-15.

Zwass, V., "Electronic Commerce: Structures and Issues", International Journal of Electronic Commerce, Fall 1996, vol. 1, No. 1, (Fall .1996), 3-23.

* cited by examiner

→ IN ORDER TO VIEW YOUR PRE-ORDERS, YOU MUST LOG IN OR BECOME A MEMBER.

MEMBER LOG-IN

MEMBER NAME:

PASSWORD:

☐ REMEMBER MY MEMBER NAME AND PASSWORD. WHAT IS THIS?

FORGET YOUR MEMBER NAME OR PASSWORD?

BECOME A MEMBER!

REGISTERING IS QUICK AND EASY. BECOME A MEMBER NOW AND DISCOVER A WHOLE NEW WORLD OF BUYING AND SELLING!

\* PLEASE NOTE: ALL FIELDS ARE REQUIRED

PLEASE TELL US SOMETHING ABOUT YOURSELF.

FIRST NAME:

LAST NAME:

EMAIL ADDRESS:

RETYPE EMAIL:

PLEASE CHOOSE YOUR MEMBER NAME AND PASSWORD.

MEMBER NAME:
(5 TO 20 CHARACTERS, LETTERS AND NUMERALS, NO SPACES)

PASSWORD:
(5 TO 20 CHARACTERS, LETTERS AND NUMERALS, NO SPACES)

RETYPE PASSWORD:

☑ WE OCCASIONALLY PROVIDE OUR CUSTOMERS WITH EMAIL UPDATES, COUPONS AND SPECIAL OFFERS. UNCHECK THIS BOX IF YOU DON'T WANT TO RECEIVE THESE UPDATES.

FIG. 4

| SELL YOUR STUFF | HELP DESK | WISH LIST/PRE-ORDERS | POWER SEARCH | SHOPPING CART | YOUR ACCOUNT |

HOME > MUSIC

IMAGE

**AMNESIAC * [6/5]** ~84
RADIOHEAD

OUR BEST PRICE: $10.85
LIST PRICE: $17.97 (SAVE: $7.12)

ACTUAL ITEMS FOR SALE MAY VARY FROM THIS IMAGE

PRODUCT HIGHLIGHTS

STEREO CD
JUNE 2001

LIST PRICE: $17.97
UPC 724353-27624-3
CAPITOL/EMI RECORDS
CATALOG 32764

FIND OUT MORE...
FULL PRODUCT INFO

NOT READY TO BUY?
ADD TO YOUR WISH LIST, PREORDER THIS ITEM

STANDARD SHIPPING (USPS MEDIA MAIL) FOR THIS ITEM IS $2.25. —86

LIKE NEW   SORTED BY PRICE   23 ITEMS IN STORE

ABOUT THIS ALBUM:
>> SONG LIST

ABOUT THE ARTIST:
>> OTHER WORKS

| PRICE | | SELLER (RATING) | SELLER COMMENTS |
|---|---|---|---|
| $10.85 | BUY! | RECEMP (4.8/5.0) | UNWRAPPED UNPLAYED CASE SCRATCHED |
| $10.85 | BUY! | MBHATIA 10 NOT RATED | PLAYED ONCE, MINT CONDITION |

FIG. 5

| SELL YOUR STUFF | HELP DESK | WISH LIST/PRE-ORDERS | POWER SEARCH | SHOPPING CART | YOUR ACCOUNT |

CHOOSE SHIPPING ADDRESS

YOU CURRENTLY DO NOT HAVE AN ADDRESS STORED. PLEASE ENTER YOUR SHIPPING ADDRESS BELOW.

ENTER A NEW SHIPPING ADDRESS:

NAME — JOHN SMITH
STREET ADDRESS
CITY
  IF U.S. MILITARY, ENTER APO/FPO FOR CITY.
STATE — SELECT STATE ▼
  IF U.S. MILITARY, SELECT AE, AP, OR AA FROM BOTTOM OF LIST FOR STATE.
ZIP CODE
COUNTRY — USA

[USE THIS ADDRESS]   100

FIG. 6B

| SELL YOUR STUFF | HELP DESK | WISH LIST/PRE-ORDERS | POWER SEARCH | SHOPPING CART | YOUR ACCOUNT |

CHOOSE BILLING ADDRESS

YOU CURRENTLY DO NOT HAVE A CREDIT CARD STORED.

[ADD NEW CARD]

---

JOB OPPORTUNITIES | AFFILIATE PROGRAM | PRIVACY POLICY |
COMPANY INFORMATION | HELP DESK | BECOME A MEMBER | YOUR ACCOUNT |
SHOPPING CART | ANNOUNCEMENTS | REFER A FRIEND - GET $5

BACK TO TOP                                                                 102

FIG. 6C

| SELL YOUR STUFF | HELP DESK | WISH LIST/PRE-ORDERS | POWER SEARCH | SHOPPING CART | YOUR ACCOUNT |

ADD CREDIT CARD

CARDHOLDER NAME  [                    ]
CARD TYPE        [VISA ▼]
CREDIT CARD NUMBER [                  ]
EXPIRATION DATE  [1 ▼] [2001 ▼]

THIS ADDRESS SHOULD MATCH YOUR CREDIT CARD BILLING ADDRESS.
BILLING ADDRESS  [                    ]
                 [                    ]
CITY             [                    ]
IF U.S. MILITARY, ENTER APO/FPO FOR CITY.
STATE            [      ▼]
IF U.S. MILITARY, SELECT AE, AP, OR AA FROM
BOTTOM OF LIST FOR STATE.
ZIP CODE         [          ]
PHONE NUMBER     [   ][   ][   ] EXT [   ]

[ADD CREDIT CARD]                                                               104

FIG. 6D

CONFIRM AND PLACE YOUR PRE-ORDER

REVIEW THE INFORMATION BELOW AND CONFIRM YOUR PRE-ORDER

WHEN AN ITEM BECOMES AVAILABLE THAT MATCHES YOUR REQUEST, IT WILL BE AUTOMATICALLY PURCHASED FOR YOU, YOUR CREDIT CARD WILL BE CHARGED, AND YOU WILL RECEIVE AN EMAIL NOTIFICATION.

NOTE: PRE-ORDERS ARE FILLED BASED ON REQUESTED PRICE AND DATE SUBMITTED.     PLACE PRE-ORDER NOW  ~108

PRE-ORDER SUMMARY

**AMNESIAC * [6/5] (CD, RELEASE YEAR: 2001)**              $6.00
RADIOHEAD

MINIMUM CONDITION: ANY
MINIMUM SELLER RATING: ANY
EXPIRATION: 07/18/01
SHIPPING: MEDIA MAIL

NOTE: ALL PRE-ORDERS ARE SHIPPED ARE SHIPPED MEDIA MAIL.
$2.25

| | |
|---|---|
| SUBTOTAL | $6.00 |
| SHIPPING AND HANDLING | $2.25 |
| TOTAL | $8.25 |

THE TOTAL SHOWN ABOVE IS THE MAXIMUM PRICE AT WHICH THIS ORDER WILL BE FILLED. HOWEVER, IT MAY BE FILLED FOR A LOWER PRICE.

| TO BE SHIPPED TO: | TO BE BILLED TO: |
|---|---|
| JOHN SMITH | VISA ENDING WITH: 0001 |
| 10 1ST STREET | ZIP CODE: 9000 |
| SAN JOSE, CA 9000 | EDIT BILLING INFORMATION |
| EDIT SHIPPING ADDRESS | |

PLACE PRE-ORDER NOW

| SELL YOUR STUFF | HELP DESK | WISH LIST/PRE-ORDERS | BECOME A MEMBER | SHOPPING CART | YOUR ACCOUNT |

SELL YOUR STUFF

BOOKS
SELL PAPERBACKS, AUDIOBOOKS, TEXTBOOKS, AND MORE...

MUSIC
SELL ROCK CDs, COUNTRY CDs, BLUES CDs, POP CDs AND MORE...

MOVIES/DVDs
SELL VIDEOS, DVDs, LASERDISCS AND MORE...

GAMES
SELL PLAYSTATION GAMES, SEGA GAMES AND MORE...

COMPUTERS
SELL LAPTOPS, DESKTOPS, PRINTERS, SCANNERS AND MORE...

ELECTRONICS
SELL CAMERAS, PHONES, TV's, VIDEO GAME SYSTEMS AND MORE...

SPORTING GOODS
SELL BASKETBALLS, HOCKEY STICKS, GOLF CLUBS AND MORE...

TRADING CARDS
SELL BASEBALL CARDS, FOOTBALL CARDS AND MORE...

IF YOU KNOW THE ISBN, UPC, OR MANUFACTURER PART NUMBER FOR YOUR PRODUCT, ENTER IT HERE:   QUICK SELL: [          ] CONTINUE

FOR ISBN's OR UPC's USE THE MULTIPLE ITEMS LISTINGS PAGE TO LIST MORE THAN ONE ITEM AT A TIME.

MORE INFORMATION FOR SELLERS:
HOW TO PROTECT YOUR SELLER RATING.
WE RESPECT YOUR PRIVACY AND SECURITY.
WE PROVIDE A SHIPPING ALLOWANCE TO COVER SHIPPING COSTS.

DO YOU HAVE A LOT TO SELL?
FROM INDIVIDUALS TO HIGH VOLUME RETAILERS AND WHOLESALERS, WE HAVE SOLUTIONS FOR EVERYONE. FIND OUT WHAT WE CAN DO FOR YOU.

JOB OPPORTUNITIES | AFFILIATE PROGRAM | PRIVACY POLICY |
COMPANY INFORMATION | HELP DESK | BECOME A MEMBER | YOUR ACCOUNT |
SHOPPING CART | ANNOUNCEMENTS | REFER A FRIEND - GET $5

BACK TO TOP                                                            200

SELLING MUSIC IS EASY AND REWARDING

TO START SELLING, JUST ENTER THE UPC NUMBER OF YOUR CD AND CLICK 'CONTINUE'   206

| 7-2348-48879-2-5 | CONTINUE |

USE THE MULTIPLE ITEM LISTING PAGE TO LIST MORE THAN ONE ITEM AT A TIME.

WHAT IS A UPC NUMBER AND HOW DO I FIND IT?
UPC CODES ARE UNIQUE CATALOGUE NUMBERS THAT IDENTIFY A PARTICULAR ITEM. THEY CAN BE USUALLY BE FOUND ON THE BACK OF YOUR PRODUCT.

PICTURED IS AN EXAMPLE TO HELP YOU FIND THE UPC NUMBER OF YOUR CD.

MORE TIPS ON UPC NUMBERS:

- WHEN ENTERING UPCs, MAKE SURE YOU INCLUDE ANY SMALLER NUMERALS THAT APPEAR TO THE LEFT OR RIGHT OF THE MAIN BARCODE NUMERALS.
- SOME CDs HAVE ISBNs; YOU SHOULD IGNORE THEM AND ONLY ENTER THE UPC.

JOB OPPORTUNITIES | AFFILIATE PROGRAM | PRIVACY POLICY | COMPANY INFORMATION | HELP DESK | BECOME A MEMBER | YOUR ACCOUNT | SHOPPING CART | ANNOUNCEMENTS | REFER A FRIEND - GET $5

FIG. 8B

SELL > MUSIC

1 TELL US ABOUT YOUR ITEM   2 SET CONDITIONS AND NOTES   3 SET PRICE AND LIST ITEM

PLEASE ENTER THE CONDITION OF THE ITEM YOU ARE LISTING. IF YOU WISH YOU MAY ALSO ADD AN EXPLANATORY NOTE BELOW. THE NOTES FIELD IS FOR PURPOSES OF DESCRIBING THE ITEM ONLY. THE NOTES FIELD MAY NOT BE USED FOR ANY OTHER PURPOSE. (YOUR RATING OF THE ITEM CONDITION MUST BE CONSISTENT WITH THE QUALITY RATING POLICY.)

**AMNESIAC * [6/5]**

PRODUCT HIGHLIGHTS

PRIMARY ARTIST: RADIOHEAD

FORMAT: CD

RELEASE DATE: 06/05/2001

LIST PRICE: $17.97

CATALOG NO.: 32764

UPC: 724353276423

RECORD LABEL: CAPITOL/EMI RECORDS

CONDITION [SELECT ONE ▼] ~210

NOTES [_____] ~212
(UP TO 70 CHARACTERS)

CONTINUE

(IT IS EXTREMELY IMPORTANT THAT YOU ACCURATELY DESCRIBE THE ITEMS THAT YOU LIST; IF YOU DO NOT DO SO, WE RESERVE THE RIGHT TO WITHHOLD PAYMENT FOR ITEMS THAT ARE IN OUR JUDGEMENT INCONSISTENT WITH OUR QUALITY RATING POLICY OR LISTING PRACTICES. SELLERS WHO VIOLATE THESE POLICIES WILL HAVE THEIR ACCOUNTS REMOVED FROM THE SITE.)

| SELL YOUR STUFF | HELP DESK | WISH LIST/PRE-ORDERS | BECOME A MEMBER | SHOPPING CART | YOUR ACCOUNT |

CREATE SELLER'S ACCOUNT: STEP 1 OF 2

THERE IS NO CHARGE TO REGISTER OR LIST AN ITEM. HOWEVER, WE DO REQUIRE YOUR CREDIT CARD INFORMATION AND TELEPHONE NUMBER. HERE'S WHY.

CREDIT CARD INFORMATION
YOU CURRENTLY HAVE A CREDIT CARD ON FILE AND DO NOT NEED TO ENTER ONE FOR SELLER VERIFICATION.

CONTACT INFORMATION
   PHONE [408] [947] [8200] EXT.[    ]

(YOUR TELEPHONE NUMBER WILL BE KEPT CONFIDENTIAL AND MAY BE USED IN RARE SITUATIONS WHEN PROCESSING YOUR ACCOUNT.)

FAX [          ] (OPTIONAL)

CONTINUE

WHY DO YOU NEED MY CREDIT CARD NUMBER?
WE USE YOUR CREDIT CARD INFORMATION TO VERIFY YOUR IDENITY AND YOUR TELEPHONE NUMBER AS ANOTHER WAY TO PROTECT OUR MEMBERS FROM FRAUD. WHEN YOU REGISTER AS A SELLER, WE WILL VERIFY THAT THE NAME AND BILLING ADDRESS YOU ENTERED MATCH THE NAME AND BILLING ADDRESS ON THE CREDIT CARD. WE REQUIRE THIS OF EVERYONE SELLING TO CREATE THE SAFEST, MOST SECURE MARKETPLACE POSSIBLE. WE WILL NOT CHARGE YOU ANYTHING TO REGISTER. ENTERING YOUR CREDIT CARD IS SAFE, AS WE UTILIZE THE LATEST ENCRYPTION TECHNOLOGY AVAILABLE. WE MAY ONLY CHARGE YOUR CREDIT CARD IN ACCORDANCE WITH OUR MEMBER AGREEMENT.

CREATE SELLER'S ACCOUNT: STEP 2 OF 2

PAYMENT METHOD
PLEASE SELECT EITHER DIRECT DEPOSIT (ACH) OR PRINTED CHECK AS YOUR PAYMENT METHOD.

○ DIRECT DEPOSIT (FREE SERVICE, FASTER PAYMENT)

WHY IS DIRECT DEPOSIT BETTER? LEARN MORE.

ENTER YOUR BANK INFORMATION HERE:
BANK NAME:  BANK ROUTING #:  CHECKING ACCOUNT #:

DON'T KNOW YOUR BANK ROUTING # OR CHECKING ACCOUNT #? GET HELP NOW.

OR

○ PRINTED CHECK
ENTER YOUR CHECK DELIVERY INFORMATION HERE:

CHECK PAYABLE TO
CONTACT NAME
STREET ADDRESS

CITY
STATE  SELECT STATE ▼
ZIP CODE
COUNTRY  USA

SHIPPING METHODS
AT A MINIMUM, ALL SELLERS ARE REQUIRED TO SEND ITEMS USING THE UNITED STATES POST OFFICE'S MEDIA MAIL RATE, BUT MANY SELLERS ALSO CHOOSE TO SUPPORT PRIORITY MAIL AS WELL.

PLEASE SELCT THE OPTIONS YOU WISH TO SUPPORT FROM BELOW

| SELL YOUR STUFF | HELP DESK | WISH LIST/PRE-ORDERS | BECOME A MEMBER | SHOPPING CART | YOUR ACCOUNT |

1 TELL US ABOUT YOUR ITEM    2 SET CONDITIONS AND NOTES    3 SET PRICE AND LIST ITEM

BASED ON THE CONDITION OF THIS ITEM AND THE BEST PRICE WE FOUND ON THE WEB, WE HAVE ENTERED A SUGGESTED PRICE BELOW. HOWEVER, YOU MAY ENTER ANY PRICE YOU WISH.   216

SELL > MUSIC

A BUYER HAS PRE-ORDERED THIS ITEM!! SELL INSTANTLY FOR $8.99   218

SELL NOW   220

SET YOUR ITEM PRICE

ITEM CONDITION: VERY GOOD

RECOMMENDED PRICE: $14.10
LAST SOLD PRICE: $3.00
AVERAGE LISTED PRICE (VERY GOOD): $14.10
CURRENT HIGHEST PRICE (VERY GOOD): $16.23
CURRENT LOWEST PRICE (VERY GOOD): $10.99
MINIMUM LISTING PRICE IS $0.75
LEARN MORE ABOUT PRICING

224

AMNESIAC * [6/5]

PRODUCT HIGHLIGHTS

PRIMARY ARTIST: RADIOHEAD

FORMAT: CD

RELEASE DATE: 06/05/2001

▶ YOUR PRICE: $ [14.10]  222

LIST ITEM    EDIT INFO    CANCEL

LIST PRICE: $17.97

CATALOG NO.: 32764

UPC: 724353276423

RECORD LABEL: CAPITOL/EMI RECORDS (IT IS EXTREMELY IMPORTANT THAT YOU ACCURATELY DESCRIBE THE ITEMS THAT YOU LIST; IF YOU DO NOT DO SO WE RESERVE THE RIGHT TO WITHHOLD PAYMENT FOR ITEMS THAT ARE IN OUR JUDGMENT INCONSISTENT WITH OUR QUALITY RATING POLICY OR LISTING PRACTICES. SELLERS WHO VIOLATE THESE POLICIES WILL HAVE THEIR ACCOUNTS REMOVED FROM THE SITE.)

METHOD AND SYSTEM TO FACILITATE PRE-ORDERING VIA AN ELECTRONIC COMMERCE FACILITY, AND TO AUTOMATICALLY FACILITATE SATISFYING OF A PRE-ORDER UPON LISTING OF AN APPROPRIATE OFFER VIA THE ELECTRONIC COMMERCE FACILITY

FIELD OF THE INVENTION

The present invention relates broadly to the field of electronic commerce and, more specifically, to facilitating the pre-ordering of an offering (e.g., goods and services), via an automated transaction facility.

BACKGROUND OF THE INVENTION

A potential buyer, when accessing an electronic commerce facility (e.g., an online auction facility, exchange or the like) may often be unwilling to conclude a transaction relating to current offerings (e.g., goods or services) provided via the electronic commerce facility for a number of reasons. For example, the potential buyer may be unable to locate an offering that satisfies the exact requirements of the potential buyer. The potential buyer may be unwilling or unable to establish a transaction under the terms and conditions of a current offering, but may be willing to conclude that the transaction if the terms and conditions of that offering are modified, or if an alternative offering having different terms and conditions becomes available via the electronic commerce facility.

In order to monitor an electronic commerce facility for modifications in the terms and conditions of an offering, or to locate an alternative offering that satisfies the requirements of potential buyer, the potential buyer may be required to continually monitor the electronic commerce facility. This continual monitoring of electronic commerce facility is inconvenient and time-consuming.

The above-identified problem is particularly prevalent in the person-to-person electronic commerce environment, where different instances of a specific item (e.g., a book or a compact disc) can vary dramatically in the sale price, condition, format, color etc. Further, the reputations of sellers in such person-to-person environments play an important part in the decision of a buyer to purchase a particular item from a particular seller.

SUMMARY OF THE INVENTION

According to a first aspect of the present invention, there is provided a method to facilitate a transaction via a network-based transaction facility. A pre-order relating to an item is recorded at the transaction facility, the pre-order specifying a plurality of pre-order attributes. An offer to sell an offering (e.g., an item) is received at the transaction facility, the offer specifying a plurality of offer attributes. A matching operation is automatically performed to detect a correspondence between the pre-order and the offer, the matching operation utilizing at least one pre-order attribute of the plurality of pre-order attributes and at least one offer attribute of the plurality of offer attributes to detect the correspondence. Responsive to a detection of the correspondence by the matching operation, a transaction facilitating operation is automatically performed to facilitate establishment of a transaction whereby the pre-order is satisfied by the offer to sell the item.

In one embodiment, the transaction facilitating operation includes communicating the pre-order to a seller from which the offer to sell was received. The communication of the pre-order may include communicating to the seller a user-selectable option to instantly satisfy the pre-order with the offer and thereby to establish the transaction.

In a further embodiment, the transaction facilitating operation includes establishing a transaction whereby the pre-order is satisfied by the offer when all of the pre-order attributes of the plurality of pre-order attributes are satisfied by the plurality of offer attributes.

According to a second aspect of the present invention, there is provided a method to facilitate pre-ordering of an offering via a network-based transaction facility. Responsive to user identification of an offering, offering information is communicated to a user regarding the offering. In conjunction with the offering information, a selectable option is communicated to the user to pre-order the offering by specifying pre-order attribute information.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 4 provides representation of an exemplary login user interface, according to an exemplary embodiment of the present invention.

FIG. 5 provides a depiction of a listing user interface, according to an exemplary embodiment of the present invention.

FIGS. 6B-6E illustrate further examples of pre-order user interfaces that may be generated by a commerce facility and presented to a potential buyer in order to solicit pre-order attribute information.

FIG. 8A illustrates an exemplary sales interface that may be generated to facilitate navigation by a seller to a specific offering.

FIG. 8B illustrates an exemplary offering identification user interface that includes an item description field to receive an item description in the form of a UPC code.

FIG. 8C illustrates an exemplary condition and notes user interface.

FIGS. 8D-8E provide examples of account set-up interfaces.

FIG. 8F displays a price user interface, according to an exemplary embodiment of the present invention, which shows a pre-order box that includes attribute information regarding a pre-order identified as at least partially matching an offer.

DETAILED DESCRIPTION

A method and system to facilitate pre-ordering via an electronic commerce facility, and automatically to facilitate the satisfying of a pre-order upon listing of an appropriate offer via the electronic commerce facility, are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including fixed-price sale and purchase transactions, auctions and the like.

Architecture-Transaction Facility

Figure 1:
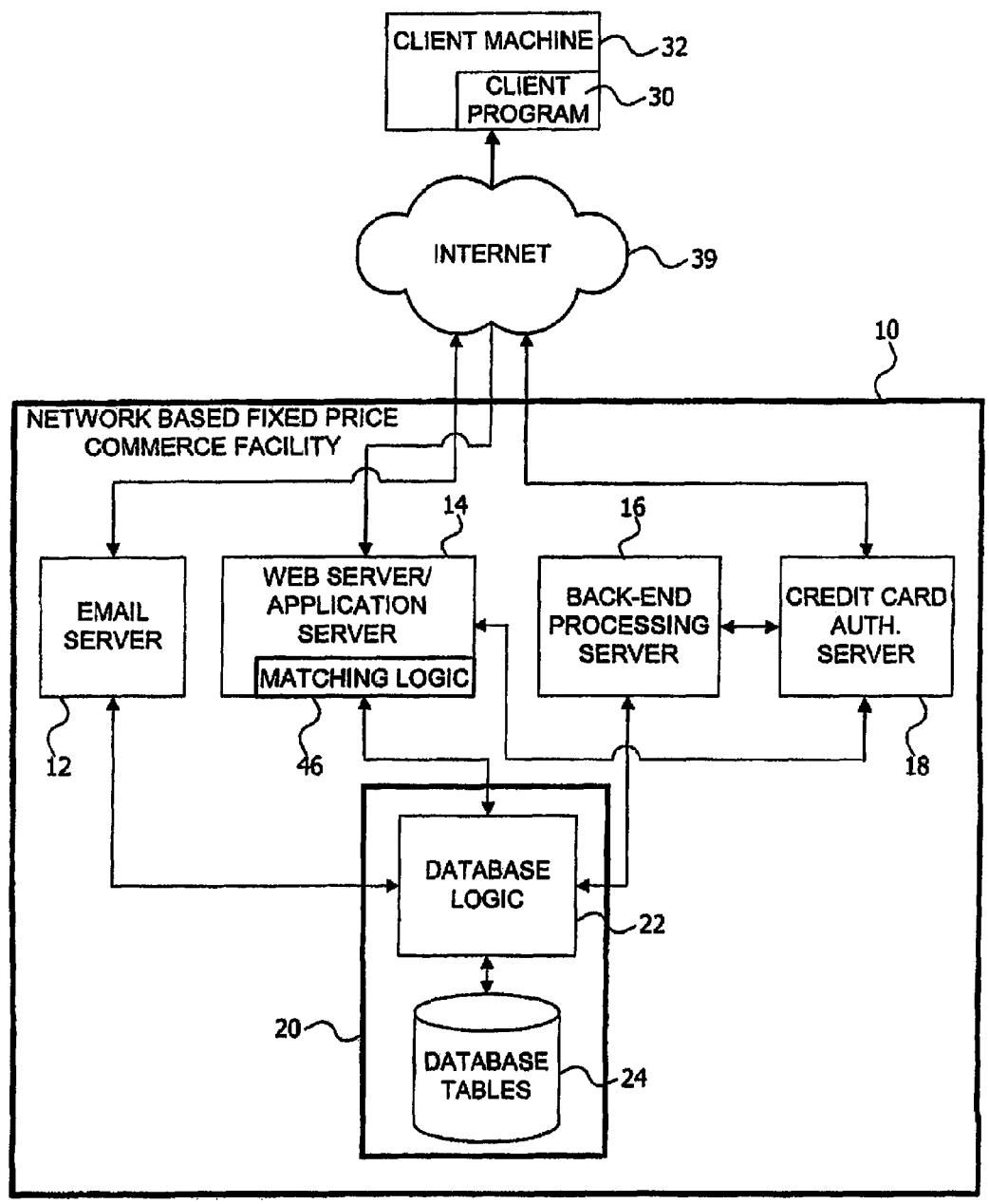
FIG. 1 is a block diagram illustrating an exemplary network-based transaction facility in the form of a fix-price commerce facility.

FIG. 1 is a block diagram illustrating an exemplary network-based transaction facility in the form of a fixed-price commerce facility 10. While an exemplary embodiment of the present invention is described within the context of the commerce facility 10, it will be appreciated by those skilled in the art that the invention will find application in many different types of computer-based, and/or network-based, commerce facilities. It will also be appreciated by those skilled in the art that the invention may be used in commerce facilities of other architectures.

The commerce facility 10 includes a number of types of front-end servers and back-end servers. The front-end servers include an e-mail server 12 that receives and transmits e-mail communications on behalf of the commerce facility 10. The e-mail server 12 may provide, inter alia, automated e-mail communications to users of the commerce facility 10.

The front-end servers further include a Web/application server 14 that includes the application and business logic modules. The Web/application server 14 may incorporate a number of modules of application logic that support various functions provided by the commerce facility 10.

The back-end servers include a back-end processing server 16, a credit card authorization server 18, and a database engine 20 including database logic 22 that accesses a collection of database tables 24.

The commerce facility 10 may interact with a client program 30, such as a browser (e.g., the Internet Explorer distributed by Microsoft Corp. of Redmond Wash.) that executes on a client machine 32 (e.g., a personal computer (PC), a personal digital assistant (PDA), a cellular telephone, or other mobile device). The client machine 32 accesses the commerce facility 10 via a network such as, for example, the Internet 34. Other examples of networks that a client machine 32 may utilize to access the commerce facility 10 include a wide area network (WAN), a local area network (LAN), a wireless network (e.g., a cellular network), or a Public Switched Telephone Network (PSTN).

Database Structure and Application Logic

Figure 2A:
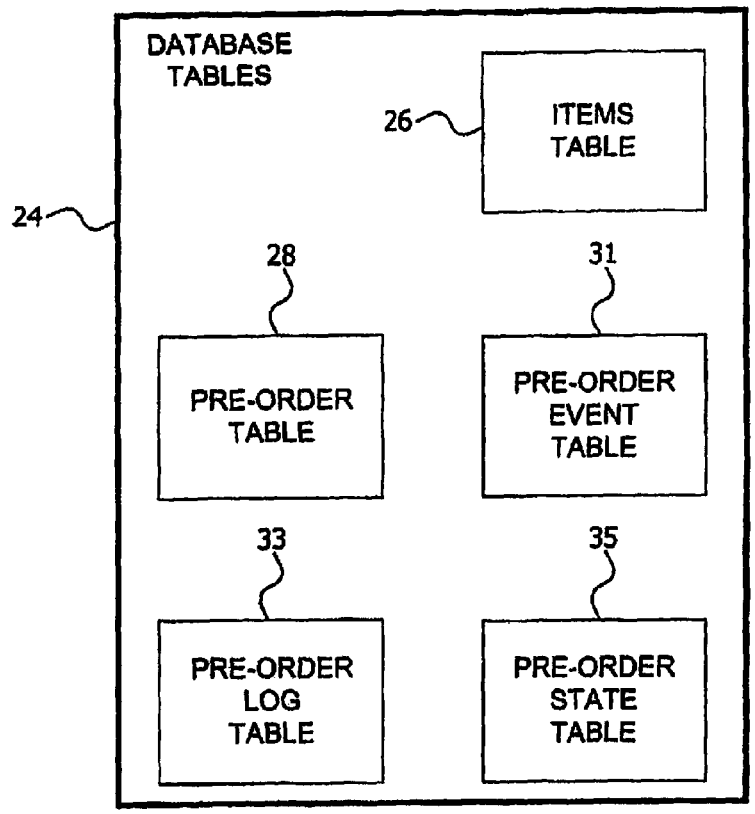
FIG. 2A is a block diagram illustrating exemplary tables may be included within database tables maintained and access by a database logic.

FIG. 2A is a block diagram illustrating exemplary tables that may be included within the database tables 24, maintained by and accessed via the database logic 22. The database tables 24 may, in one embodiment, be implemented as a relational database, and include a number of tables having entries, or records, that are linked by indices and keys. In an alternative embodiment, the database tables 24 may be implemented as a collection of blocks in a block-oriented database.

As illustrated, the database tables 24 may include an items table 26 that includes a record for each item (or offering) that is available for purchase via the commerce facility 10. To this end, each of the records within the items table 26 may include an item identifier, an item description, an item price, a seller identifier etc.

A pre-order table 28 includes a record for each pre-order for an item (or offering) that may become available via the commerce facility 10 under certain terms and conditions. A description of the fields that may be included within an exemplary embodiment of the pre-order table 28 are provided immediately below:

| Name | Type |
|---|---|
| PRE-ORDER_ID | NUMBER |
| STATE_ID | NUMBER |
| ACCOUNT_ID | NUMBER |
| RELEASE_ID | NUMBER |
| ADDRESS_ID | NUMBER |
| CREDIT_CARD_ID | NUMBER |
| PRODUCT_TYPE_ID | NUMBER |
| ORDER_ITEM_ID | NUMBER |
| CREATE_DATE | DATE |
| EXPIRE_DATE | DATE |
| TIMESTAMP | DATE |
| MAX_PRICE | NUMBER(10, 2) |
| CONDITION_GRADE | NUMBER |
| MIN_SELLER_RATING | NUMBER(1) |
| ACCEPT_UNRATED | NUMBER(1) |
| SHIP_FORMAT_ID | NUMBER |

A pre-order log table 33 is utilize to track authorization to satisfy a pre-order utilizing an offering, as will be described in further detail below, once a match between a pre-order and an offering is detected. A description of the fields that may be included within an exemplary embodiment of a pre-order log table 33 is provided immediately below:

| Name | Type |
|---|---|
| LOG_ID | NUMBER |
| PRE-ORDER_ID | NUMBER |
| CREDIT_CARD_ID | NUMBER |
| AMOUNT | NUMBER(10, 2) |
| PN_REFERENCE | VARCHAR2(20) |
| PN_RESULT_CODE | NUMBER |
| PN_RESPONSE_CODE | VARCHAR2(1) |
| PN_ERROR_CODE | NUMBER |
| PN_AUTH_CODE | VARCHAR2(20) |
| PN_AVS_ADDRESS | VARCHAR2(1) |
| PN_AVS_ZIP | VARCHAR2(1) |
| NOTES | VARCHAR2(200) |
| TIMESTAMP | DATE |
| PRE-ORDER_EVENT_ID | NUMBER(2) |

A pre-order event table 31 is utilized to track pre-order events. A description of the fields that may be included within an exemplary pre-order event table 31 is provided immediately below:

| Name | Type |
| --- | --- |
| PRE-ORDER_EVENT_ID | NUMBER(4) |
| PRE-ORDER_EVENT_DESC | VARCHAR2(100) |

A pre-order state table 35 is utilized to track the respective states of pre-orders for which records exist within the pre-order table 28. A description of exemplary states is provided below. A description of the fields that may be included within a record of the pre-order state table 35 is provided immediately below:

| Name | Type |
| --- | --- |
| STATE_ID | NUMBER |
| STATE_DESC | VARCHAR2(200) |

Figure 2B:
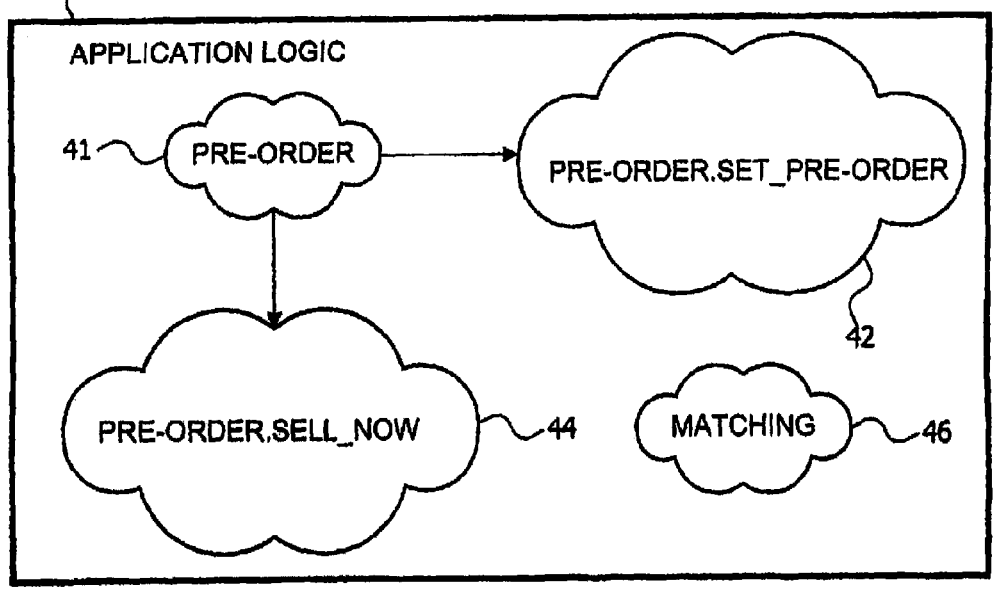
FIG. 2B is a diagrammatic representation of application logic that may operate in conjunction with a web/application server of the commerce facility.

FIG. 2B is a diagrammatic representation of application logic 40 that may operate in conjunction with the Web/application server 14 of the commerce facility 10. The application logic 40 includes, inter alia, (1) pre-order logic 41, which in turn includes, inter alia, a set_pre-order database procedure 42 and a sell_now database procedure 44 and (2) matching logic 46. Dealing first with the pre-order logic 41, the pre-order logic 41 operates to perform a number of operations with respect to a particular pre-order record within the pre-order table 28 on the occurrence of certain events. Specifically, the pre-order logic 41 may set the state of a particular pre-order to an active, suspended, reserved, locked, declined, confirmed or deleted state. The pre-order logic 41 includes a number of state variables, listed below, that record the state of a particular pre-order, and a number of procedures that operate to modify the state of a pre-order, and to perform various functions associated with changing the state of a pre-order. A description of the variables and procedures that are included within an exemplary embodiment of the pre-order logic 41 is provided immediately below:

| Element | Type |
| --- | --- |
| STATE_ACTIVE | CONSTANT |
| STATE_NEW | CONSTANT |
| STATE_SUSPENDED | CONSTANT |
| STATE_SUSPENDED_NEW | CONSTANT |
| STATE_RESERVED | CONSTANT |
| STATE_RESERVED_INTERACTIVELY | CONSTANT |
| STATE_LOCKED | CONSTANT |
| STATE_DECLINED | CONSTANT |
| STATE_DECLINED_EMAIL_SENT | CONSTANT |
| STATE_CONFIRMED | CONSTANT |
| STATE_CONFIRMED_EMAILS_SENT | CONSTANT |
| STATE_DELETED | CONSTANT |
| EVENT_CC_CHARGE_FAILED | CONSTANT |
| EVENT_ACTIVATE_EXPIRED | CONSTANT |
| CLEAN_BATCH_RESERVED | PROCEDURE |
| CLEAN_WEB_RESERVED | PROCEDURE |
| CONFIRM | PROCEDURE |
| RESERVE | PROCEDURE |
| RESET | PROCEDURE |
| DECLINE_EMAIL_SENT | PROCEDURE |
| NEW_PRE-ORDER_EMAIL_SENT | PROCEDURE |
| BACKEND_SALE_EMAIL_SENT | PROCEDURE |
| DECLINE | PROCEDURE |
| LOG_EVENT | PROCEDURE |
| SELL_NOW | PROCEDURE |
| PROCESS | PROCEDURE |
| COMPUTE_BUYER_COSTS | PROCEDURE |
| COMPUTE_PRE-ORDER_COSTS | PROCEDURE |
| SET_ITEM | PROCEDURE |
| SET_PRE-ORDER | PROCEDURE |
| DEL | PROCEDURE |
| SUSPEND | PROCEDURE |
| UNSUSPEND | PROCEDURE |

The set_pre-order database procedure 42 is invoked by a front-end call with information supplied by a potential buyer, including login information, to create or update a pre-order within the pre-order table 28. Variables utilized by the procedure 42, according to an exemplary embodiment of the present invention, are listed immediately below:

| Parameter | Type |
| --- | --- |
| PRE-ORDER_ID_IN | NUMBER |
| RELEASE_ID_IN | NUMBER |
| ACCOUNT_ID_IN | NUMBER |
| ADDRESS_ID_IN | NUMBER |
| CREDIT_CARD_ID_IN | NUMBER |
| PRODUCT_TYPE_ID_IN | NUMBER |
| SHIP_FORMAT_ID_IN | NUMBER |
| MIN_SELLER_RATING_IN | NUMBER(1) |
| CONDITION_GRADE_IN | NUMBER |
| MAX_PRICE_IN | NUMBER(10, 2) |
| EXPIRE_DATE_IN | DATE |
| ACCEPT_UNRATED_IN | NUMBER(1) |
| PRE-ORDER_ID_OUT | NUMBER |

The sell_now database procedure 44 is invoked by a front-end call with information supplied by a seller, including login information, to satisfy a pre-order within the pre-order table 28 with an offer received from the seller. Variables utilized by the procedure 44, according to an exemplary embodiment of the present invention, are listed immediately below:

| Parameter | Type |
| --- | --- |
| ACCOUNT_ID_IN | NUMBER |
| RELEASE_ID_IN | NUMBER |
| EXISTING_ITEM_ID_IN | NUMBER |
| PRICE_IN | NUMBER(10, 2) |
| PRODUCT_TYPE_ID_IN | NUMBER |
| SELL_COND_IN | NUMBER |
| SHIP_FORMAT_ID_IN | NUMBER |
| PRICING_METHOD_ID_IN | NUMBER |
| NOTES_IN | VARCHAR2(4000) |
| SELLER_NOTES_IN | VARCHAR2(4000) |
| CLIENT_SESSION_ID_IN | VARCHAR2(300) |
| PRE-ORDER_ID_IN | NUMBER |
| TOTAL_IN | NUMBER(10, 2) |
| TRANS_ID_IN | VARCHAR2(20) |
| RES_CODE_IN | NUMBER |
| RESP_CODE_IN | VARCHAR2(1) |
| ERR_CODE_IN | NUMBER |
| AUTH_CODE_IN | VARCHAR2(20) |
| ADDR_CODE_IN | VARCHAR2(1) |
| ZIP_CODE_IN | VARCHAR2(1) |
| OFFER_ID_IN | NUMBER |
| INVOICE_ID_OUT | NUMBER |
| ORDER_ID_OUT | NUMBER |

The matching logic 46 operates in a manner to be described in further detail below to invoke the procedure 44 when a match is detected between a pre-order record within the pre-order table 28 and information regarding an offer from a potential seller via the commerce facility 10.

Methodology-Recording a Pre-Order for an Offering

Figure 3:
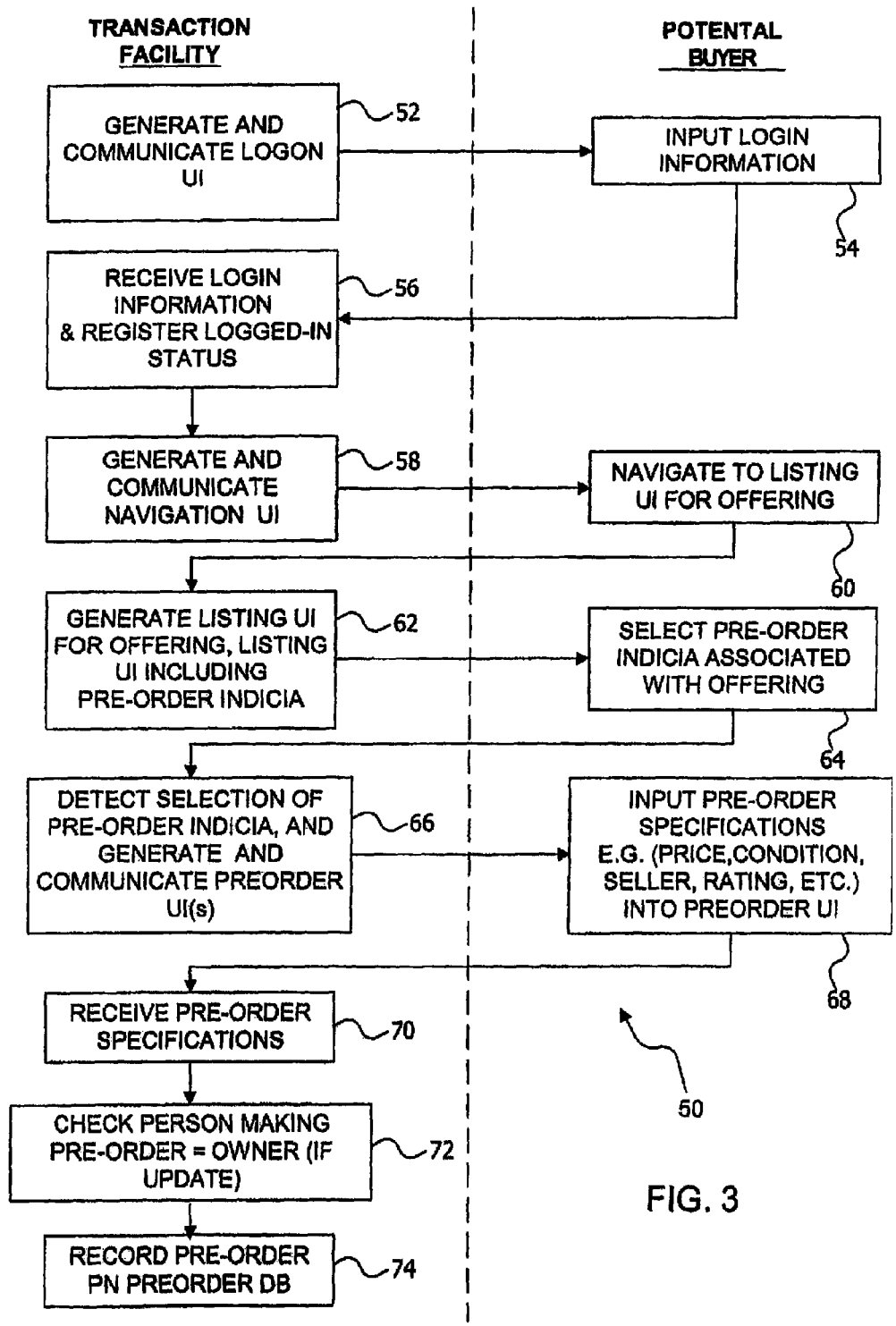
FIG. 3 is a flow chart illustrating a method, according to an exemplary embodiment of the present invention, to facilitate pre-ordering of an offering via the commerce facility.

FIG. 3 is a flowchart illustrating a method 50, according to exemplary embodiment of the present invention, to facilitate pre-ordering of an item (or offering) via a network-based transaction facility, such as the commerce facility 10 illustrated in FIG. 1. The method 50 commences at block 52 with the generation and communication of a login user interface (e.g., a hypertext markup language (HTML) document) from the commerce facility 10 to a client machine 32 accessible by a potential buyer. FIG. 4 provides a representation of such a login user interface 80, according to an exemplary embodiment of the present invention, which may be generated by the commerce facility 10 and then communicated to the potential buyer at block 52. It will be noted from FIG. 4 that the user interface 80 facilitates login by existing members of the commerce facility 10, or registration with the commerce facility 10 by users who are currently not members.

At block 54 of FIG. 3, the potential buyer inputs appropriate login information (or registration information if the potential buyer is not a registered member), which is communicated back to the commerce facility 10. At block 56, the login information (registration information) is received at the commerce facility 10, and a login status for the potential buyer is registered.

At block 58, the commerce facility 10 generates and communicates to the potential buyer one or more navigation user interfaces so as to allow the potential buyer to navigate a Web site operated by the commerce facility 10. In one embodiment, the navigation user interfaces may provide the potential buyer with the options of (1) navigating the Web site utilizing search keywords to identify offerings provided for sale by the commerce facility 10 and of (2) navigating the Web site utilizing category listings of offerings provided for sale via the commerce facility 10.

At block 60, the potential buyer actively utilizes the navigation user interfaces to navigate to a listing user interface that provides specific details regarding a particular item (or offering) that is available for purchase via the commerce facility 10. This navigation information is communicated back to the commerce facility 10 from the client machine 32 operated by the potential buyer.

At block 62, the commerce facility 10 generates a listing user interface 84 that provides offering attribute information that specifies the attributes of, and provides further details regarding, a particular item (or offering). FIG. 5 provides a depiction of a listing user interface 84, according to an exemplary embodiment of the present invention, for a music album (Amnesiac by Radiohead) to which the potential buyer may have navigated utilizing the navigation interfaces generated at block 58. The exemplary listing user interface 84 displays offering attribute information including description information (e.g., a digital image of an item, a UPC code or an ISBN code), price information, shipping information, a number of units in stock etc. It will also be noted that the listing user interface 84 includes a pre-order indicia in the form of pre-order hypertext 86 that is displayed in conjunction with the offering attribute information and is selectable by the potential buyer to generate a pre-order for the relevant item. Accordingly, if the potential buyer is not willing to purchase the item for which offering attribute information is displayed within the listing user interface 84, the potential buyer has the option of pre-ordering the relevant item by specifying pre-order attribute information that may differ from the offering attribute information (e.g., the price specified as part of the pre-order attribute information may be different from a price specified as part of the offering attribute information).

Returning to FIG. 3, at block 64, the potential buyer may select the pre-order indicia (e.g., by clicking on the pre-order hypertext 86) to exercise an option to generate a pre-order relating to the relevant item, this selection then being communicated to the commerce facility 10.

Figure 6A:
FIG. 6A illustrates a pre-order user interface, according to an exemplary embodiment of the present invention, in the form of a HTML document.

At block 66, the commerce facility 10 then detects the selection of the pre-order indicia, and proceeds to generate and communicate a sequence of pre-order user interfaces to the client machine 32 accessed by the potential buyer. The pre-order user interfaces are designed to solicit from the potential buyer pre-order attribute information specifying the pre-order. FIG. 6A illustrates a pre-order user interface 90, according to an exemplary embodiment of the present invention, in the form of a HTML document that may be communicated from the commerce facility 10 to the client machine 32 for display via the client program 30. The pre-order user interface 90 includes a number of fields to receive pre-order attribute information. A price field 92 is to receive a monetary value, a condition field 94 is to receive a description of a minimum condition of an item that would be acceptable to satisfy the pre-order, a seller rating field 96 is to receive a minimum seller rating for a seller of an item that would be acceptable to satisfy the pre-order, and an expiration field 98 to receive a specification of a time for which the pre-order should remain active.

In one embodiment, a seller rating is automatically established by the commerce facility 10 based on a trading history of a seller. This automatic establishment of a seller rating may be performed based on metrics that are monitored and determined by the commerce facility 10 (e.g., a speed of delivery, quality of products, a number of transactions obligation defaults etc.). Alternatively, the seller rating may be based, at least in part, on input received by the commerce facility 10 from other users that have transacted with the relevant seller. For example, upon conclusion of the transaction with the seller, a buyer may be prompted to provide a rating on a specified scale. This rating may be an overall rating, or the user may be asked to rate the seller on each of a number of characteristics, attributes or criteria.

Accordingly, it will be appreciated that the pre-order attribute information may specify a number criteria that should be at a minimum satisfied or exceeded in order for the pre-order as a whole to be satisfied. The pre-order attribute information may furthermore specify other characteristics regarding the pre-order (e.g., expiration).

The fields 94, 96 and 98, in the exemplary embodiment, are populated from drop-down menus associated with these fields. The pre-order user interface 90 also displays item description information (e.g., an image of the item). Certain of the fields within the pre-order user interface 90 may also be pre-populated with default inputs in order to increase the user friendliness of the interface 90. For example, the expiration field 98 may be presented with a default inputs of "four weeks".

FIGS. 6B-6E show further examples of pre-order user interfaces that may be generated by the commerce facility 10 and presented to potential buyer in order to solicit pre-order attribute information. Specifically, FIG. 6B illustrates an exemplary shipping address interface 100 that solicits shipping address information to be included within the pre-order attribute information from the potential buyer. FIG. 6C illustrates an exemplary billing information interface 102 that advises the potential buyer whether or not credit card information for the relevant potential buyer is stored by the commerce facility 10. FIG. 6D illustrates an exemplary credit card interface 104 that solicits credit card information from the potential buyer so as to enable the commerce facility 10, as will be described in further detail below, automatically to perform a credit card authorization in the event that the pre-order can be satisfied by a subsequent offering via the commerce facility 10. FIG. 6E illustrates an exemplary confirmation interface 106 that communicates confirmation of the pre-order attribute information to the potential buyer, and also includes a user-selectable confirmation indicia 108 that is selectable by the potential buyer to finally place the pre-order. It will be noted from FIG. 6E that the confirmation interface 106, in addition to providing the pre-order price information presented by the potential buyer, also provides an estimated shipping and handling charge. In a further embodiment, tax information may also be provided within the confirmation interface 106.

Returning again to FIG. 3, at block 68, the potential buyer then inputs the pre-order attribute information into the pre-order user interfaces, this pre-order attribute information then being received at the commerce facility 10 at block 70. It should be noted that this pre-order attribute information may be utilized to establish a new pre-order, or may be utilized by the commerce facility 10 to modify or update an existing pre-order. At block 72, in the case of an update to a pre-existing pre-order, a check is performed to determine whether the person making the pre-order (i.e., the potential buyer) is the "owner" (i.e., the person that originally authored the pre-existing pre-order) thereof.

At block 74, the commerce facility 10 proceeds to create (or update) a pre-order utilizing the received pre-order attribute information. More specifically, the pre-order logic 41 calls the set_pre-order database procedure 42 with the pre-order attribute information provided by the potential buyer, including appropriate login information. The set_pre-order database procedure 42 then executes to create an appropriate record within the pre-order table 28.

Figure 7A:
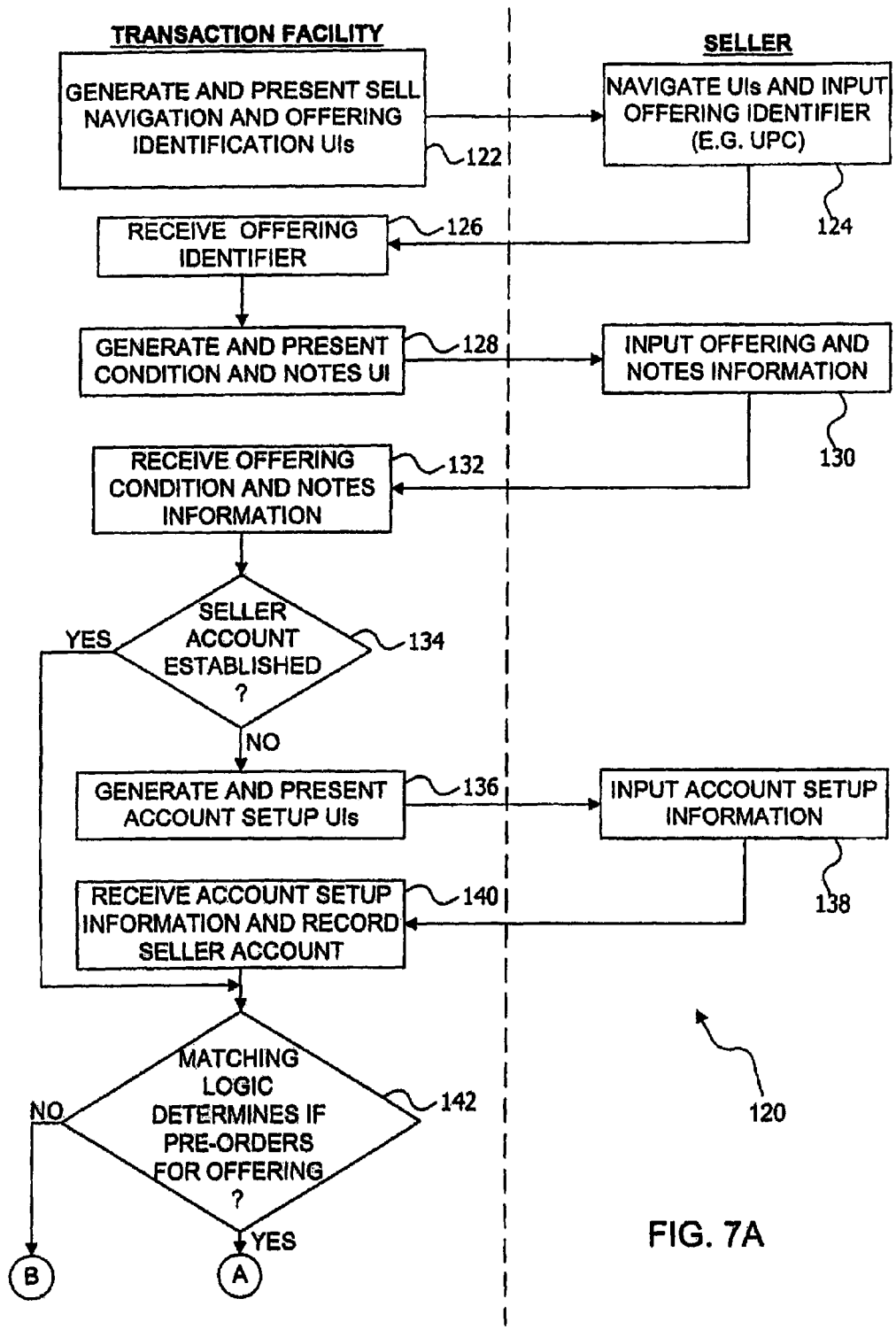
FIGS. 7A-7C show a flowchart illustrating a method, according to an exemplary embodiment of the present invention, of facilitating establishment of a transaction via a network-based transaction facility, whereby a correspondence is detected between a pre-order and an offer.
Figure 7B:
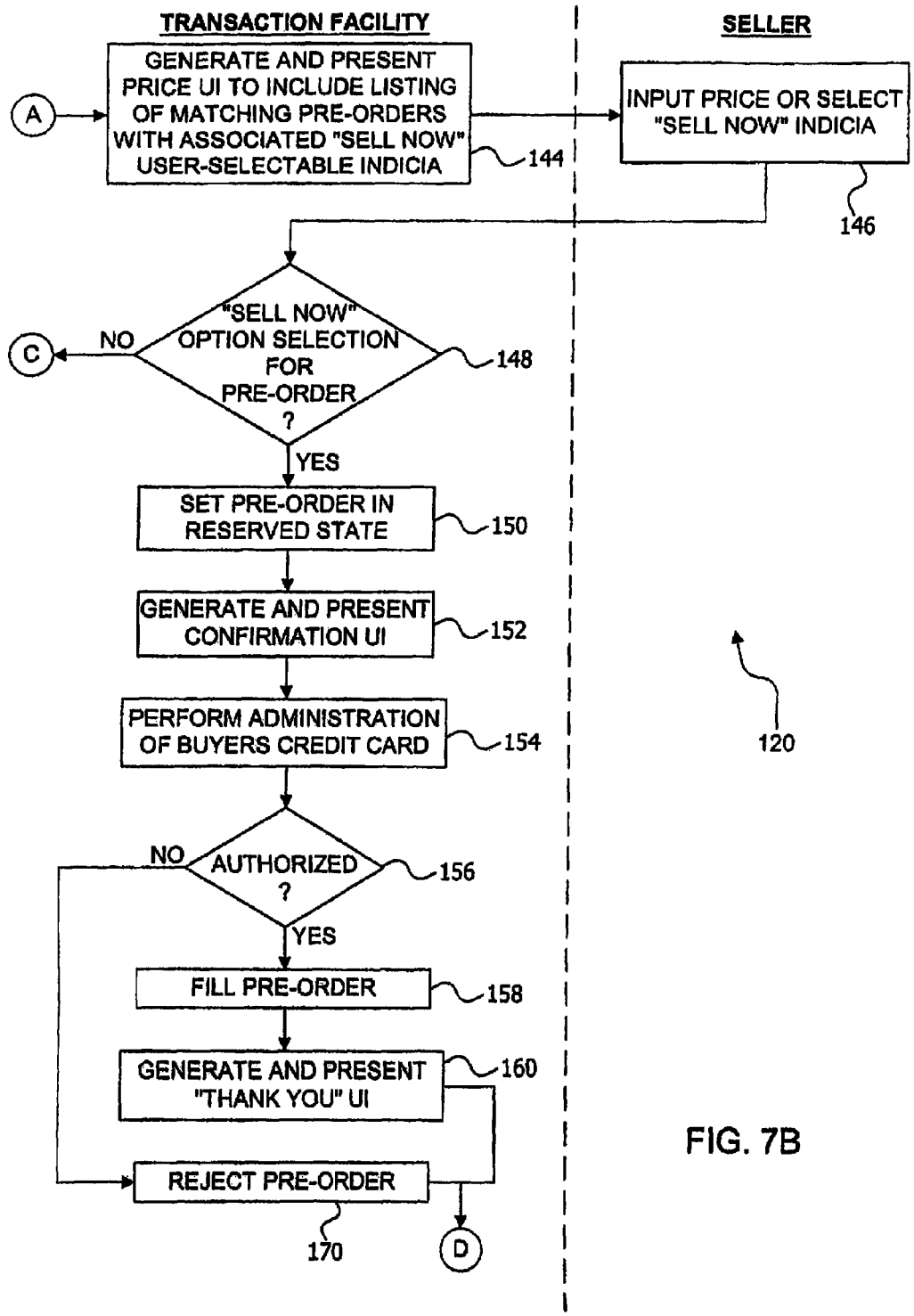
Figure 7C:
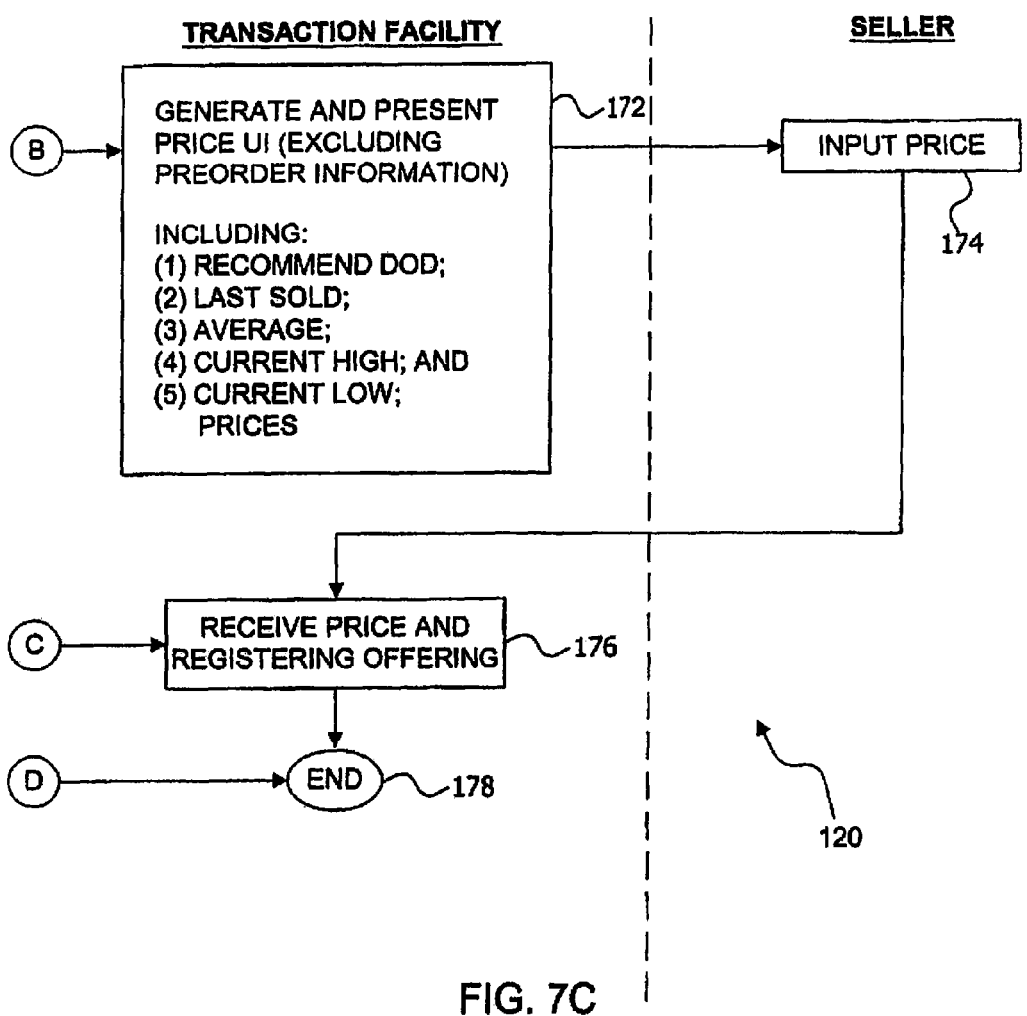

Methodology-Facilitating a Transaction by Detecting Correspondence Between a Pre-Order and an Offer FIGS. 7A-7C show a flowchart illustrating a method 120, according to an exemplary embodiment of the present invention, of facilitating a transaction via a network-based transaction facility whereby a correspondence is detected between a pre-order and an offer.

The method commences at block 122, with the generation and presentation of sales navigation and offering identification user interfaces. FIG. 8A illustrates an exemplary sales interface 200 that may be generated at block 122 to facilitate navigation by a seller to a specific item (or offering). It will be noted that the interface 200 displays a number of item categories through which the seller may navigate to identify a particular item (or item type) that the seller wishes to sell. FIG. 8B illustrates an exemplary offering identification user interface 204 that includes an item description field 206 to receive an item description in the exemplary form of a UPC code. For example, a seller wishing to sell a compact disk via the commerce facility 10 may input the UPC code for the relevant compact disc into the item description field 206, and in this way identify the compact disc to the commerce facility 10.

At block 124, the seller then navigates the navigation user interfaces, and inputs an offering identifier (e.g., a UPC or ISBN code) into an offering identification user interface. At block 126, the offering identifier is received at the commerce facility 10. At block 128, the commerce facility 10 then generates and presents a condition and notes user interface to solicit, from the seller, offer attribute information that specifies an offer. For example, the offer attribute information may specify the terms and conditions of the offer, as well as provide a description of a product or service that is being offered and certain criteria pertaining to the offer. FIG. 8C illustrates an exemplary condition and notes user interface 208 that may be generated at block 128. The interface 208 solicits from the seller condition information specifying the condition of an item that is being offered. To this end, a condition field 210 is populated utilizing a drop-down menu that presents a default set of condition values from which a condition value is selectable. The interface 208 also allows the seller to input notes regarding the item for sale into a notes field 212.

At block 130 the seller then provides offer attribute information, in the form of offering condition and notes information, via the condition and notes user interface. The offering condition and notes information is then received at the commerce facility 10 at block 132.

At block 134 a determination is made by the commerce facility 10 whether a seller account has been established with the commerce facility 10. If not, at block 136, a series of account setup user interfaces are generated and presented to the seller. FIG. 8D and FIG. 8E provide examples of such account setup user interfaces to 210 and 212. At block 138, the seller then inputs account setup information into the account setup user interfaces, this account setup information then being received by the commerce facility 10 at block 140. A seller account is then established.

At decision block 142, the matching logic 46 determines if any matching pre-orders are recorded within the pre-order table 28 for the offer being presented by the seller. It will be noted that this matching operation is performed prior to the offer being published by the commerce facility 10.

An exemplary query that may be issued by the matching logic 46 at decision block 142 to locate a pre-order within the pre-order table 28 that will be filled (or satisfied) by an offer from the seller is provided below:

Inputs:
1=product_id (unique identifier like UPC or ISBN)
2=min. condition
3=min. seller rating
SELECT pre-order_id, max_price, condition_grade, accept_unrated, min_seller_rating
FROM tx_pre-order p, usr_creditcard cc, inv_condition_grade g
WHERE p.release_id=INPUT_1
and p.condition_grade=g.grade_id
and g.rank<=(select rank from inv_condition_grade where grade_id=INPUT_2)
and min_seller_rating<=INPUT_3
and state_id<10
and accept_unrated=1
and EXPIRE_DATE>sysdate
and cc.credit_card_id=p.credit_card_id
and cc.credit_is_active=1
and cc.credit_expire_date>=sysdate
ORDER BY max_price desc, p.create_date It will be noted that the above query attempts to perform a match based on three criteria, namely an offering identifier (e.g., a product identifier such as UPC or an ISBN code, a minimum condition criteria, and a minimum seller rating. The product identifier information and the condition information for the offer are received at blocks 126 and 132 of the method 120 shown in FIG. 7A. These criteria are compared against the product_type_id, condition_grade and min_seller_rating variables for all active records stored in the pre-order table 28 to locate any matching pre-orders. While the attributes (or criteria) described in the above exemplary query are used to identify pre-orders, it will nonetheless be appreciated that a narrow or wider range of attributes or criteria may be utilized by the matching logic 46 to identify matching pre-orders and offers at decision block 142.

If matching pre-orders are located at decision block 142, the method 120 proceeds to block 144 shown in FIG. 7B, where the commerce facility 10 generates and presents a price user interface. The price user interface is generated to include a listing (or at least a description) of matching pre-orders located at decision block 142. In addition to the listing of matching pre-orders, a further transaction facilitating operation is performed in that a user-selectable option (e.g., to instantly satisfy any one of the listed pre-orders) is generated and included within the price user interface. In one exemplary embodiment, the user-selectable option is communicated by including a "sell now" user-selectable indicia 220 within the price user interface.

FIG. 8F displays a price user interface 214, according to an exemplary embodiment of the present invention, which is shown to include a pre-order box 216 that includes attribute information regarding a located pre-order (i.e., price information 218) and a "sell now" indicia 220 that is user-selectable to instantly satisfy (or fill) the pre-order with an appropriate offer (e.g., an offer for which the price matches the pre-order price).

It will be noted that the price user interface 214 also includes a price field 222 into which the seller may input price information, and also communicates comparative price information 224 to the seller. For example the comparative price information may include a recommended price (which is also inserted as a default price into the price field 222), a last sold price for the relevant item, an average listed price for similar items in a similar condition, a current highest price for similar items in a similar condition, a current lowest price for similar items in a similar condition, and a minimum listing price for the relevant item. The presentation of the comparative price information assists the seller in assessing whether the pre-order communicated in the pre-order box 216 is an attractive option, or alternatively helps the seller formulate a price to be inputted into the price field 222.

Moving on to block 146 of the method 120, the seller then inputs a price into the price field 222 of the price user interface 214 or alternatively selects the "sell now" indicia 220 within the price user interface 214.

At decision block 148, the commerce facility 10 makes a determination as to whether the seller has agreed to fill (or satisfy) the offer with the pre-order by selection, for example, of the "sell now" indicia 220, or has alternatively selected to list and publish the offer via the commerce facility 10. If it is determined at decision block 148 that the seller has selected to satisfy the order utilizing the pre-order, at block 150, the pre-order logic 41 invokes the above-described sell_now database procedure 44 to satisfy the pre-order. Specifically, the selected pre-order is set in a reserved state.

At block 152, the commerce facility 10 generates and presents a confirmation interface. An authorization of the credit card details of the buyer, who is the owner of the match pre-order, is performed at block 154. If it is determined that the credit card details are successfully authorized at decision block 156, at block 158 the pre-order is filled by the offer at block 158, and a "thank you" confirmation user interface is generated and presented at block 160. On the other hand, if the authorization of the credit cards details is determined to have failed at decision block 156, the pre-order is rejected at block 170.

Progressing now to FIG. 7C, in the event that it is determined at decision block 142 that the matching logic 46 has failed to locate any matching pre-orders for an offer at block 172, shown in FIG. 7c, the price user interface, described above, is generated to exclude the pre-order box 216, and the seller is presented only with the option of inputting a price into the price field 222. At block 174 the seller then inputs the price into the field 222, and the price information is then received at the commerce facility 10 at block 176. The offer is then registered, and published by the commerce facility 10.

In one embodiment of the present invention, where multiple matching pre-orders are located at decision block 142, only pre-order attribute information for the highest-priced pre-order will be displayed within the price user interface generated at block 144. In an alternative embodiment, only the oldest existing and active pre-order for which a match is detected will be included within the user interface generated at block 144. In yet a further alternative embodiment, a list of all active matched pre-orders may be displayed, so as enable the seller to choose between pre-orders to be filled by the order.

Upon conclusion of the method 120, the seller may be presented with a "thank you" user interface that provides shipping and confirmation information. Further, an email job may send emails to both the buyer and the seller confirming establishment of the transaction.

The method 120 described above seeks to fill a pre-order upon entry of an order by a seller, and prior to publication of the commerce facility 10. The method 120 automatically presents the seller, during an order specification process, with the option of filling the pre-order.

The provision of offer attribute information to the commerce facility 10 via user interfaces generated and presented by the commerce facility 10 is one way which the offer attribute information may communicated to the commerce facility 10. Another popular manner in which offer attribute information is presented to the commerce facility 10 is utilizing listing client programs that are executed on a client machine 32 to enable a seller to specify offer attribute information for multiple offers "offline" from the commerce facility 10. This offer attribute information is then download in a batch process from the client machine 32 to the commerce facility 10 via a network, such as the Internet 34. In this scenario it will be appreciated that it may be inconvenient to interrupt the batch process to provide pre-order information to the seller. Accordingly, in an alternative embodiment of the present invention, a "batch filling" method may be employed to fill pre-orders utilizing orders that are specified in a batch form.

Figure 9:
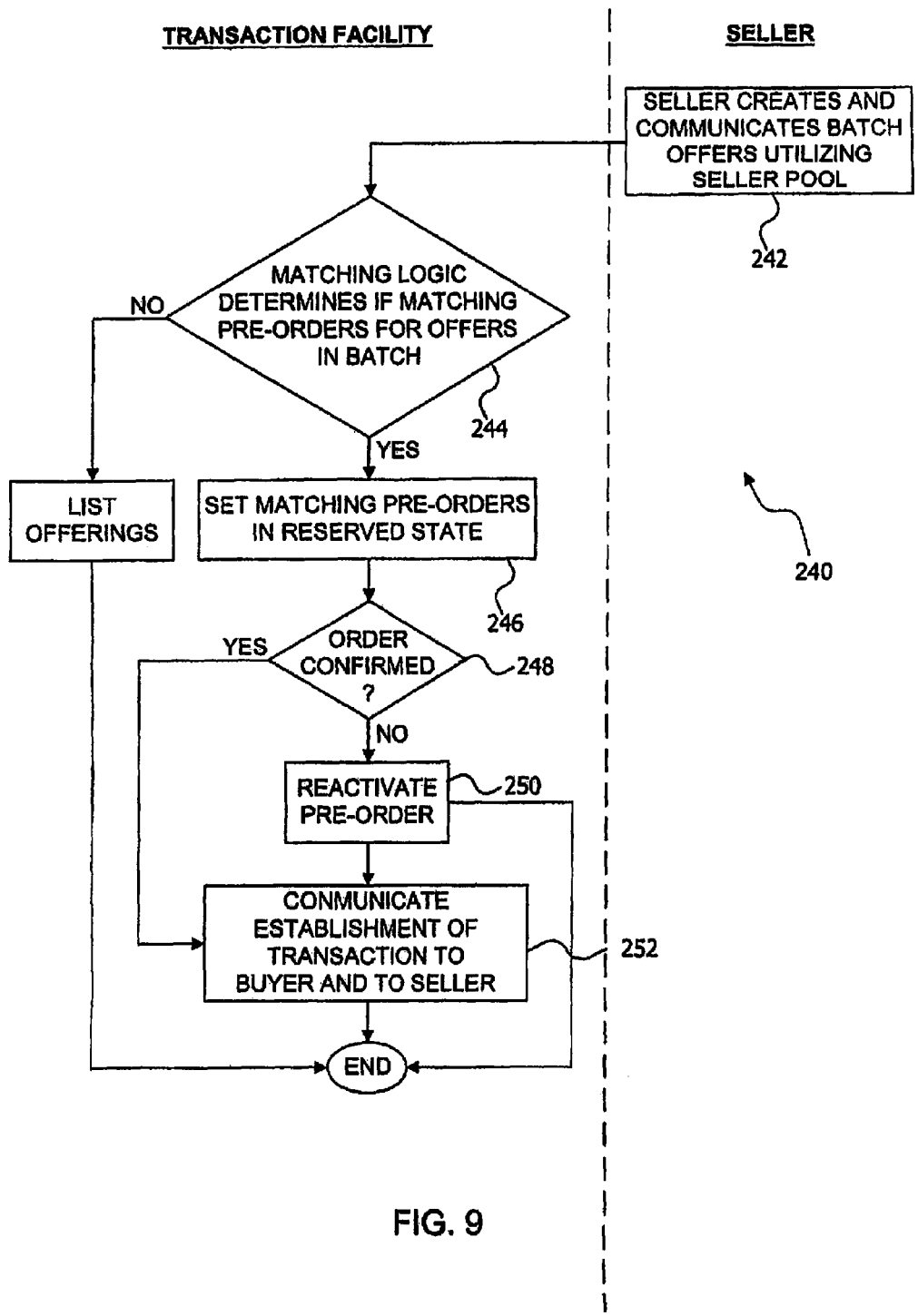
FIG. 9 is a flowchart illustrating a method, according to an exemplary embodiment of the present invention, whereby a batch specification of multiple offers may be utilized by a commerce facility to satisfy one or more pre-orders.

FIG. 9 is a flow chart illustrating a method 240, according to an embodiment of the present invention, whereby a batch specification of multiple offers may be utilized by the commerce facility 10 to satisfy one or more pre-orders.

The method 240 commences at block 242 with a seller creating and communicating batch offers to the commerce facility 10 utilizing a bulk-listing seller tool (e.g., the Mister Lister seller tool provided by eBay, Inc.).

At decision block 244, the matching logic 46 determines, in the manner described above, whether any pre-orders match the offers in the batch. The matching operation performed at decision block 244 may differ from that performed at decision block 142 in that, at decision block 244, an exact match between offer attributes and pre-order attributes is required for a match to be detected. This is because, within the method 240, the seller is not presented with the option of filling a pre-order that does not exactly meet the offer attributes and criteria.

An exemplary query that may be issued by the matching logic 46 at decision block 244 to find a pre-order within the pre-order table 28 that will be filled (or satisfied) by an offer within a batch of offers from the seller is provided below:

(buyer has opted to allow unrated sellers)

Inputs
1=release_id (unique identifier like UPC or ISBN)
2=max. price of an item
3=min. seller rating
4=min. condition
select i.item_id, i.offer_id, si.account_id seller_id, i.price, i.product_type_id
from inv_item i, usr_seller_info si, usr_seller_statistics stats, inv_condition_grade g
where i.release_id=INPUT_1
and i.offer_id is not null
and i.price<=INPUT_2
and i.seller_id=stats.seller_id(+)
and (stats.avg_rating IS NULL OR INPUT_3<=stats.avg_rating)
and i.condition_grade=g.grade_id
and g.rank>=(select rank from inv_condition_grade where grade_id=INPUT_4)
and i.Item_State_ID=1
and i.item_state_id_raw=1
and i.available_quantity>0
and i.seller_id=si.seller_id
order by i.price desc If one or more active pre-orders that may be filled by offers within the batch are located decision block 244, at block 246 the matching pre-orders are set into a reserved state. If the order is confirmed at decision block 248 (e.g., after authorization of credit card details as described above), the establishment of the transaction is communicated to both the buyer and seller by the email job at block 252. Alternatively, if the order is not confirmed the relevant pre-orders are then reactivated at block 250.

Returning to decision block 244, in the event that no pre-orders are located that may be filled by the orders included within the batch, at block 254, the offers within the batch are then listed by the commerce facility 10.

In summary, the methods 120 and 240 differ with respect to a transaction facilitating operation that is performed upon detecting a pre-order that may potentially be filled by an offer. Specifically, within the method 120, a minimum overall correspondence between offer and pre-order attribute information is detected, and the seller is them prompted to either accept or reject a pre-order that may or may not deviate from the full set of attribute information for the relevant offer. Within the method 240, on the other hand, a high degree of correspondence between the offer and pre-order attribute information is required, as a transaction may summarily and automatically be establish upon the detection of a pre-order with a predetermined degree of correspondence (e.g., the pre-order may only be filled by the offer if there is an exact correspondence between all attribute information of the pre-order and the offer). In short, the present invention contemplates that various degrees of correspondence may be utilized to detect a match between a pre-order and an offer, these varying degrees of correspondence including an exact correspondence, a correspondence below a maximum threshold, a correspondence above a minimum threshold, and a correspondence within a predetermined range. Further, the above-described attributes may be specifying at least one criterion, and the correspondence may be detected by determining whether that particular criterion is met, or exceeded.

Computer System

Figure 10:
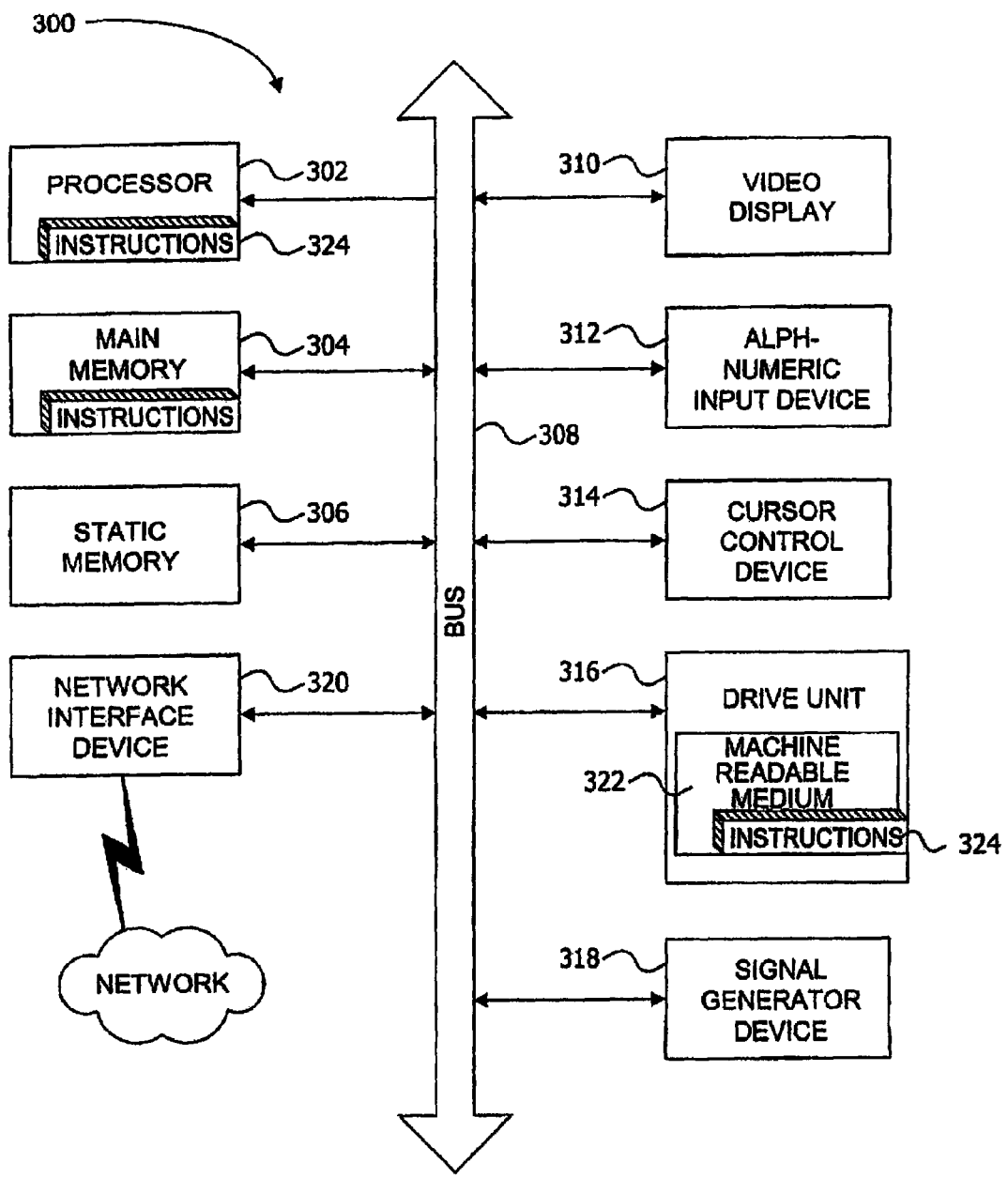
FIG. 10 shows a diagrammatic representation of a machine in the exemplary form of a computer system in which a set of instructions may be executed.

FIG. 10 shows a diagrammatic representation of a machine in the exemplary form of a computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 18 (e.g., a speaker) and a network interface device 320

The disk drive unit 316 includes a machine-readable medium 324 on which is stored a set of instructions (i.e., software) 326 embodying any one, or all, of the methodologies described above. The software 326 is also shown to reside, completely or at least partially, within the main memory 304 and/or within the processor 302. The software 326 may further be transmitted or received via the network interface device 320. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and system to facilitate pre-ordering via an electronic commerce facility, and automatically to facilitate the satisfying of a pre-order upon listing of an appropriate offer via the electronic commerce facility, have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed:

1. A method to facilitate a transaction via a network-based transaction facility, the method including:
    recording a pre-order relating to an item in a processor-implemented database of the transaction facility, the pre-order specifying a plurality of pre-order attributes including a minimum pre-order product condition and minimum seller rating;
    receiving an offer to sell the item at the transaction facility, the offer specifying a plurality of offer attributes including an offer product condition and a seller rating;
    automatically performing with processor-implemented matching logic a matching operation to detect a correspondence between the pre-order and the offer, the matching operation utilizing the plurality of pre-order attributes and the plurality of the offer attributes to detect the correspondence; and responsive to the processor-implemented matching logic detecting a correspondence between the pre-order and the offer, automatically performing a transaction when the plurality of pre-order attributes are satisfied by the plurality of the offer attributes, wherein, if a batch of offers are detected matching the pre-order, the matching pre-orders are set to a reserve state, and wherein a second transaction is performed when one of the pre-orders is confirmed.

2. The method of claim 1 wherein the minimum pre-order product condition includes an item descriptor, an item price and a pre-order expiration specification.

3. The method of claim 1 wherein the seller rating is established based on a trading history of a seller from which the offer originates.

4. The method of claim 1 wherein the seller rating is determined by input received from other users of the transaction facility.

5. The method of claim 2 wherein the item description comprises any one of a UPC code and an ISBN code.

6. The method of claim 1 wherein the offer product condition includes an item descriptor, an item price and a seller identifier.

7. The method of claim 1 wherein the matching operation utilizes multiple pre-order attributes of the plurality of pre-order attributes and multiple offer attributes of the plurality of offer attributes to detect the correspondence.

8. The method of claim 1 wherein the correspondence includes any one of a group of degrees of correspondence, including an exact correspondence, a correspondence below a maximum threshold, a correspondence above a minimum threshold and a correspondence within a range.

9. The method of claim 1 wherein at least one of the pre-order attributes specifies a criterion, and wherein the detecting of the correspondence includes determining whether the criterion is met or exceeded.

10. The method of claim 1 further comprising communicating the pre-order to a seller from which the offer to sell was received.

11. The method of claim 10 wherein the communication of the pre-order to the seller occurs prior to a publication of the offer to sell by the transaction facility.

12. The method of claim 10 wherein the communication of the pre-order includes communicating to the seller a user-selectable option to instantly satisfy the pre-order with the offer and thereby to establish the transaction.

13. The method of claim 10 wherein the communication of the pre-order includes communicating at least a subset of the plurality of pre-order attributes to the seller.

14. The method of claim 10 wherein the communicating on the pre-order includes causing a display of a user interface communicating the pre-order to the seller.

15. The method of claim 14 wherein the user interface comprises a markup-language document.

16. The method of claim 14 including transmitting the user interface via a network to a device accessible by the seller.

17. The method of claim 10 including communicating comparative price information to the seller in conjunction with the pre-order.

18. The method of claim 17 wherein the comparative price information includes, for the item, any one of a group of information items including a recommended price for a second item, a last sold price for an item substantially similar to the second item, an average list price for an item substantially similar to the second item, a current highest price for an item substantially similar to the second item, a current low price for an item substantially similar to the current item and a minimum listing price.

19. The method of claim 14 wherein the offer to sell is received as part of a batch of offers from the seller to sell a plurality of items.

20. The method of claim 1 wherein the item includes any one of a group of items including goods and services.

21. The method of claim 1 wherein multiple instances of the item are in existence, and the pre-order relates to any one of the multiple instances of the item that satisfies the pre-order attributes.

22. The method of claim 21 wherein the offer to sell relates to a specific instance of the multiple instances of the item.

23. The method of claim 1 wherein a single instance of the item is in existence, and both the pre-order and the offer relate to the single instance of the item.

24. A commerce system to facilitate a transaction, the system including:
   first means for recording a pre-order relating to an item at the transaction facility, the pre-order specifying a plurality of pre-order attributes including a minimum pre-order product condition and minimum seller rating; and
   second means for automatically performing a matching operation to detect a correspondence between the pre-order and an offer received at the system, the offer specifying a plurality of offer attributes including an offer product condition and a seller rating, the matching operation utilizing the plurality of pre-order attributes and the plurality of the offer attributes to detect the correspondence;
   the second means further, responsive to a detection of the correspondence by the matching operation, for automatically performing a transaction when the plurality of pre-order attributes are satisfied by the plurality of the offer attributes,
   wherein, if a batch of offers are detected matching the pre-order, the matching pre-orders are set to a reserve state, and wherein a second transaction is performed when one of the pre-orders is confirmed.

25. The system of claim 24 wherein the at least one pre-order attribute includes any one of a group of attributes including an item descriptor, an item price, an item condition, a seller rating and a pre-order expiration specification.

26. The system of claim 25 wherein the seller rating is established based on a trading history of a seller from which the offer originates.

27. The system of claim 26 wherein the seller rating is determined by input received from other users of the transaction facility.

28. The system of claim 25 wherein the item description comprises any one of a UPC code and an ISBN code.

29. The system of claim 24 wherein the at least one offer attribute includes any one of a group of attributes including an item descriptor, an item price, an item condition and a seller identifier.

30. The system of claim 24 wherein the matching operation utilizes multiple pre-order attributes of the plurality of pre-order attributes and multiple offer attributes of the plurality of offer attributes to detect the correspondence.

31. The system of claim 24 wherein the correspondence includes any one of a group of degrees of correspondence, including an exact correspondence, a correspondence below a maximum threshold, a correspondence above a minimum threshold and a correspondence within a range.

32. The system of claim 24 wherein at least one of the pre-order attributes specifies a criterion, and wherein the detecting of the correspondence includes determining whether the criterion is met or exceeded.

33. The system of claim 24 wherein the transaction facilitating operation includes communicating the pre-order to a seller from which the offer to sell was received.

34. The system of claim 33 wherein the communication of the pre-order to the seller occurs prior to a publication of the offer to sell by the transaction facility.

35. The system of claim 33 wherein the communication of the pre-order includes communicating to the seller a user-selectable option to instantly satisfy the pre-order with the offer and thereby to establish the transaction.

36. The system of claim 33 wherein the communication of the pre-order includes communicating at least a subset of the plurality of pre-order attributes to the seller.

37. The system of claim 33 wherein the communicating on the pre-order includes causing a display of a user interface communicating the pre-order to the seller.

38. The system of claim 37 wherein the user interface comprises a markup-language document.

39. The system of claim 37 wherein the communicating of the pre-order includes transmitting the user interface via a network to a device accessible by the seller.

40. The system of claim 33 including communicating comparative price information to the seller in conjunction with the pre-order.

41. The system of claim 40 wherein the comparative price information includes, for the item, any one of a group of information items including a recommended price for a second item, a last sold price for an item substantially similar to the second item, an average list price for an item substantially similar to the second item, a current highest price for an item substantially similar to the second item, a current low price for an item substantially similar to the current item and a minimum listing price.

42. The system of claim 24 wherein the offer to sell is received as part of a batch of offers from the seller to sell a plurality of items.

43. The system of claim 24 wherein the item includes any one of a group of items including goods and services.

44. The system of claim 24 wherein multiple instances of the item are in existence, and the pre-order relates to any one of the multiple instances of the item that satisfies the pre-order attributes.

45. The system of claim 24 wherein the offer to sell relates to a specific instance of the multiple instances of the item.

46. The claim of claim 24 wherein a single instance of the item is in existence, and both the pre-order and the offer relate to the single instance of the item.

47. A machine-readable medium storing a sequence of instructions that, when executed by a machine, cause the machine to facilitate a transaction via a network-based transaction facility, the method including:
  recording a pre-order relating to an item at the transaction facility, the pre-order specifying a plurality of pre-order attributes including a minimum pre-order product condition and minimum seller rating;
  receiving an offer to sell the item at the transaction facility, the offer specifying a plurality of offer attributes including an offer product condition and a seller rating;
  automatically performing a matching operation to detect a correspondence between the pre-order and the offer, the matching operation utilizing at least one pre-order attribute of the plurality of pre-order attributes and at least one offer attribute of the offer attributes to detect the correspondence;
  responsive to a detection of the correspondence by the matching operation, automatically performing a transaction when the plurality of pre-order attributes are satisfied by the plurality of the offer attributes,
  wherein, if a batch of offers are detected matching the pre-order, the matching pre-orders are set to a reserve state, and wherein a second transaction is performed when one of the pre-orders is confirmed.

* * * * *

UNITED STATES PATENT AND TRADEMARK OFFICE
CERTIFICATE OF CORRECTION

PATENT NO.      : 7,890,375 B2
APPLICATION NO. : 09/920573
DATED           : February 15, 2011
INVENTOR(S)     : Michael Schwankl et al.

It is certified that error appears in the above-identified patent and that said Letters Patent is hereby corrected as shown below:

On the Title Page
On page 3, under "Other Publications", Item (56) line 5, delete "filed" and insert -- Response filed --, therefor.

On page 3, under "Other Publications", Item (56) line 7, delete "filed" and insert -- Response filed --, therefor.

On page 3, under "Other Publications", Item (56) line 9, delete "Buisness" and insert -- Business --, therefor.

On page 3, under "Other Publications", Item (56) line 18, delete "Computer.Museum" and insert -- Computer Museum --, therefor.

On page 3, under "Other Publications", Item (56) line 30, delete "(Dec.16-18," and insert -- (Dec. 16-18, --, therefor.

On page 3, under "Other Publications", Item (56) line 68, delete "11993)," and insert -- (1993), --, therefor.

On page 4, under "Other Publications", Item (56) line 9, delete "Norwegjan" and insert -- Norwegian --, therefor.

On page 4, under "Other Publications", Item (56) line 9, delete "(NR)" and insert -- (NR), --, therefor.

On Sheet 3 of 20, Figure 3, line 1, delete "POTENTAL" and insert -- POTENTIAL --, therefor.

On Sheet 6 of 20, Figure 6A, line 18, delete "REVEIW" and insert -- REVIEW --, therefor.

Signed and Sealed this
Twenty-sixth Day of April, 2011

David J. Kappos
*Director of the United States Patent and Trademark Office*

CERTIFICATE OF CORRECTION (continued)
U.S. Pat. No. 7,890,375 B2

On Sheet 17 of 20, Figure 8E, line 25, delete "SELCT" and insert -- SELECT --, therefor.

On Sheet 19 of 20, Box 252, Figure 9, line 1, delete "CONMUNICATE" and insert -- COMMUNICATE --, therefor.

In column 14, line 23, delete "320" and insert -- 320. --, therefor.

In column 18, line 9, in Claim 46, delete "The claim" and insert -- The system --, therefor.